US009086535B2

(12) United States Patent  
Sherman et al.

(10) Patent No.: US 9,086,535 B2  
(45) Date of Patent: Jul. 21, 2015

(54) RETROREFLECTIVE ARTICLES AND DEVICES HAVING VISCOELASTIC LIGHTGUIDE

(75) Inventors: Audrey A. Sherman, St. Paul, MN (US); Marie A. Boulos, West St. Paul, MN (US); Michael A. Meis, Stillwater, MN (US); Kevin R. Schaffer, Woodbury, MN (US); Thu-Van T. Tran, Maplewood, MN (US)

(73) Assignee: 3M Innovative Properties Company, St. Paul, MN (US)

(*) Notice: Subject to any disclaimer, the term of this patent is extended or adjusted under 35 U.S.C. 154(b) by 1134 days.

(21) Appl. No.: 13/003,193

(22) PCT Filed: Jul. 9, 2009

(86) PCT No.: PCT/US2009/050012  
§ 371 (c)(1),  
(2), (4) Date: Feb. 9, 2011

(87) PCT Pub. No.: WO2010/006102  
PCT Pub. Date: Jan. 14, 2010

(65) Prior Publication Data  
US 2011/0122494 A1 May 26, 2011

Related U.S. Application Data

(60) Provisional application No. 61/079,639, filed on Jul. 10, 2008, provisional application No. 61/114,865, filed on Nov. 14, 2008, provisional application No. 61/169,973, filed on Apr. 16, 2009, provisional application No. 61/185,482, filed on Jun. 9, 2009.

(51) Int. Cl.  
*G02B 6/26* (2006.01)  
*G02B 5/128* (2006.01)  
(Continued)

(52) U.S. Cl.  
CPC ............. *G02B 5/128* (2013.01); *G02B 6/0055* (2013.01); *G09F 13/16* (2013.01)

(58) Field of Classification Search  
USPC ................... 385/31, 33, 35, 129–132, 146; 362/296.01, 297–300; 359/515, 530, 359/534, 536–541, 546  
See application file for complete search history.

(56) References Cited

U.S. PATENT DOCUMENTS 2,440,584 A 4/1948 Heltzer  
2,736,721 A 2/1956 Dexter  
(Continued)

FOREIGN PATENT DOCUMENTS

EP 0 291 206 11/1988  
EP 1 477 368 8/2007  
(Continued)

OTHER PUBLICATIONS

Muto et al., "Electrical Control of Laser Beam in Viscoelastic Polymer Thin-Film Waveguide", Electronics and Communication in Japan, Part 2, vol. 73, No. 3, 1990, pp. 92-96.  
(Continued)

*Primary Examiner* — Tina Wong  
(74) *Attorney, Agent, or Firm* — Daniel J. Iden

(57) ABSTRACT

Disclosed herein is an optical device having a light source, a viscoelastic lightguide and a retroreflective film suitable for retroreflecting light. Light from the light source enters the viscoelastic lightguide and is transported within the lightguide by total internal reflection. The optical device may have a "front lit" configuration such that light being transported within the lightguide is extracted and retroreflected by the film toward a viewer. The optical device may have a "back lit" configuration such that light being transported within the lightguide is extracted and transmitted through the film toward a viewer. The retroreflective film may comprise beaded retroreflective sheeting such as that used in traffic signs and markings.

20 Claims, 9 Drawing Sheets

(51) Int. Cl.
  *F21V 8/00* (2006.01)
  *G09F 13/16* (2006.01)

(56) References Cited

U.S. PATENT DOCUMENTS

| | | | |
|---|---|---|---|
| 3,718,712 | A | 2/1973 | Tushaus |
| 4,082,426 | A | 4/1978 | Brown |
| 4,418,110 | A | 11/1983 | May |
| 4,554,324 | A | 11/1985 | Husman |
| 4,678,695 | A | 7/1987 | Tung et al. |
| 4,737,559 | A | 4/1988 | Kellen |
| 4,808,471 | A | 2/1989 | Grunzinger |
| 5,064,272 | A | 11/1991 | Bailey |
| 5,066,098 | A | 11/1991 | Kult |
| 5,214,119 | A | 5/1993 | Leir |
| 5,450,235 | A | 9/1995 | Smith |
| 5,506,279 | A | 4/1996 | Babu |
| 5,510,171 | A | 4/1996 | Faykish |
| 5,784,197 | A | 7/1998 | Frey |
| 5,825,543 | A | 10/1998 | Ouderkirk |
| 5,828,488 | A | 10/1998 | Ouderkirk |
| 5,867,316 | A | 2/1999 | Carlson |
| 5,882,774 | A | 3/1999 | Jonza |
| 5,905,826 | A | 5/1999 | Benson, Jr. |
| 6,033,604 | A | 3/2000 | Lundin |
| 6,060,157 | A | 5/2000 | LaPerre |
| 6,083,856 | A | 7/2000 | Joseph |
| 6,096,066 | A | 8/2000 | Chen |
| 6,102,559 | A | 8/2000 | Nold |
| 6,111,696 | A | 8/2000 | Allen |
| 6,166,856 | A | 12/2000 | Araki |
| 6,179,948 | B1 | 1/2001 | Merrill |
| 6,280,822 | B1 | 8/2001 | Smith |
| 6,288,172 | B1 | 9/2001 | Goetz |
| 6,288,842 | B1 | 9/2001 | Florczak |
| 6,314,226 | B1 | 11/2001 | Nath |
| 6,352,761 | B1 | 3/2002 | Hebrink |
| 6,368,699 | B1 | 4/2002 | Gilbert |
| 6,569,521 | B1 | 5/2003 | Sheridan |
| 6,663,978 | B1 | 12/2003 | Olson |
| 6,799,880 | B2 | 10/2004 | Gozum |
| 6,827,886 | B2 | 12/2004 | Neavin |
| 6,927,900 | B2 | 8/2005 | Liu |
| 6,972,813 | B1 | 12/2005 | Toyooka |
| 6,991,695 | B2 | 1/2006 | Tait |
| 7,005,394 | B1 | 2/2006 | Ylitalo |
| 7,046,905 | B1 | 5/2006 | Gardiner |
| 7,078,093 | B2 | 7/2006 | Sheridan |
| 7,090,922 | B2 | 8/2006 | Zhou |
| 7,140,741 | B2 | 11/2006 | Fleming |
| 7,166,686 | B2 | 1/2007 | Olson |
| 7,255,920 | B2 | 8/2007 | Everaerts |
| 7,315,418 | B2 | 1/2008 | DiZio |
| 7,336,422 | B2 | 2/2008 | Dunn |
| 7,361,474 | B2 | 4/2008 | Siegler |
| 7,391,555 | B2 * | 6/2008 | Albert et al. ............... 359/296 |
| 7,498,535 | B2 | 3/2009 | Blake |
| 7,695,180 | B2 | 4/2010 | Schardt |
| 7,995,278 | B2 | 8/2011 | Endle |
| 8,651,720 | B2 * | 2/2014 | Sherman et al. ............ 362/560 |
| 2003/0034445 | A1 | 2/2003 | Boyd |
| 2003/0095770 | A1 | 5/2003 | Fewkes |
| 2003/0211317 | A1 | 11/2003 | Sheridan |
| 2005/0052750 | A1 | 3/2005 | King |
| 2005/0070976 | A1 | 3/2005 | Samuel |
| 2005/0276071 | A1 | 12/2005 | Sasagawa |
| 2006/0084780 | A1 | 4/2006 | Hebrink |
| 2006/0187552 | A1 | 8/2006 | Huang |
| 2006/0216524 | A1 | 9/2006 | Klun |
| 2006/0226561 | A1 | 10/2006 | Merrill |
| 2007/0006493 | A1 | 1/2007 | Eberwein |
| 2007/0026167 | A1 | 2/2007 | Bourdelais |
| 2007/0031641 | A1 | 2/2007 | Frisch |
| 2007/0047080 | A1 | 3/2007 | Stover |
| 2007/0047254 | A1 * | 3/2007 | Schardt et al. ............ 362/607 |
| 2007/0081254 | A1 | 4/2007 | Endle |
| 2007/0110960 | A1 | 5/2007 | Frey |
| 2007/0152834 | A1 | 7/2007 | Mimura |
| 2007/0188866 | A1 * | 8/2007 | Yukawa et al. ............ 359/530 |
| 2007/0209244 | A1 | 9/2007 | Prollius |
| 2007/0242356 | A1 | 10/2007 | Thakkar |
| 2007/0267133 | A1 | 11/2007 | Matano |
| 2007/0279391 | A1 | 12/2007 | Marttila |
| 2007/0279935 | A1 | 12/2007 | Gardiner |
| 2007/0292650 | A1 | 12/2007 | Suzuki |
| 2008/0053800 | A1 | 3/2008 | Hoyle |
| 2008/0074901 | A1 | 3/2008 | David |
| 2008/0118862 | A1 | 5/2008 | Dunn |
| 2008/0130126 | A1 | 6/2008 | Brooks |
| 2008/0232135 | A1 | 9/2008 | Kinder |
| 2009/0067151 | A1 | 3/2009 | Sahlin |
| 2009/0229732 | A1 | 9/2009 | Determan |
| 2009/0229766 | A1 | 9/2009 | Aveldson |
| 2010/0048804 | A1 | 2/2010 | Determan |
| 2010/0103521 | A1 | 4/2010 | Smith |
| 2010/0222496 | A1 | 9/2010 | Determan |
| 2010/0297406 | A1 | 11/2010 | Schaffer |
| 2011/0020640 | A1 | 1/2011 | Sherman |
| 2011/0064916 | A1 | 3/2011 | Sherman |
| 2011/0109965 | A1 | 5/2011 | Gates |
| 2011/0126968 | A1 | 6/2011 | Determan |
| 2011/0134623 | A1 | 6/2011 | Sherman |
| 2011/0165361 | A1 | 7/2011 | Sherman |
| 2011/0176325 | A1 | 7/2011 | Sherman |
| 2011/0182076 | A1 | 7/2011 | Sherman |
| 2011/0253301 | A1 | 10/2011 | Yamanaka |
| 2011/0255165 | A1 | 10/2011 | Smith |
| 2011/0255171 | A1 | 10/2011 | Endle |
| 2011/0268929 | A1 | 11/2011 | Tran |

FOREIGN PATENT DOCUMENTS

| | | |
|---|---|---|
| JP | H08-150677 A | 6/1996 |
| JP | H11-153702 A | 6/1999 |
| JP | 2003-242815 A | 8/2003 |
| JP | 2005-263994 A | 9/2005 |
| JP | 2006-120521 A | 5/2006 |
| JP | 2006-227140 A | 8/2006 |
| JP | 2007114271 | 5/2007 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01440 | 1/1997 |
| WO | WO 99/36248 | 7/1999 |
| WO | WO 99/36262 | 7/1999 |
| WO | WO 99/42536 | 8/1999 |
| WO | WO 01/71396 | 9/2001 |
| WO | WO 02/070237 | 9/2002 |
| WO | 2005/025938 A1 | 3/2005 |
| WO | WO 2005/044470 A1 | 5/2005 |
| WO | WO 2006/125174 | 11/2006 |
| WO | WO 2007/075518 | 7/2007 |
| WO | WO 2007/092152 | 8/2007 |
| WO | WO 2007/143383 | 12/2007 |
| WO | WO 2008/016978 | 2/2008 |
| WO | WO 2008/022007 | 2/2008 |
| WO | WO 2008/045200 | 4/2008 |
| WO | WO 2008/045207 | 4/2008 |
| WO | WO 2008/060731 | 5/2008 |
| WO | WO 2008/076612 | 6/2008 |
| WO | WO 2008/121475 | 10/2008 |
| WO | WO 2010/005810 | 1/2010 |
| WO | WO 2010/006102 | 1/2010 |

OTHER PUBLICATIONS

Handbook of Pressure Sensitive Adhesive Technology, Second Edition, edited by Donatas Satas, Van Nostrand Reinhold, New York, 1989, pp. 170-177.

(56) References Cited

OTHER PUBLICATIONS

U.S. Appl. No. 61/294,689 entitled "Devices and method with Viscoelastic Material," filed Jan. 13, 2010.

Williams, "Good News! Polymer OLED Technology is About to Come to a Sticky End," *Electronics World*, Oct. 2007, p. 40-41.

"OLED 'light bandage' helps in treatment of skin cancer," *LEDs Magazine*, Nov. 2, 2006, 2 pages.

Falk, et al., "Seeing the Light—Optics in Nature, Photography, Color, Vision, and Holography," Chapter 2: Principles of Geometrical Optics, pp. 53-57.

\* cited by examiner

US 9,086,535 B2

RETROREFLECTIVE ARTICLES AND DEVICES HAVING VISCOELASTIC LIGHTGUIDE

CROSS REFERENCE TO RELATED APPLICATIONS

This application is a national stage filing under 35 U.S.C. 371 of PCT/US2009/048876, filed Jun. 26, 2009, which claims priority to U.S. Provisional Application No. 61/079, 639, filed Jul. 10, 2008, U.S. Provisional Application No. 61/114,865, filed Nov. 14, 2008, U.S. Provisional Application No. 61/169,973, filed Apr. 16, 2009, and U.S. Provisional Application No. 61/185,482, filed Jun. 9, 2009, the disclosures of which are incorporated by reference in their entirety herein.

FIELD

This disclosure relates to optical articles and devices, particularly those that are retroreflective. The optical articles and devices include lightguides made with viscoelastic materials.

BACKGROUND

Retroreflective films are characterized by the ability to reflect incident light back toward an originating light source. Microsphere retroreflective sheeting, sometimes referred to as "beaded" retroreflective sheeting, typically comprises a monolayer of transparent microspheres supported by a binder. Light incident upon a front surface of the sheeting is retroreflected by the transparent microspheres and directed back toward the light source. A reflective material disposed behind the microspheres may be present to facilitate retroreflection. Beaded retroreflective sheeting may include a composite image that can provide a floating image that appears to be suspended above or below the sheeting. Beaded retroreflective sheeting may be used in traffic safety applications, such as for license plates, road signs, barricades, pavement markers and marking tape, as well as for personal safety applications including tape for clothing, headgear, vehicles and the like. Beaded retroreflective sheeting may be used to provide signage in graphic arts applications.

Beaded retroreflective sheeting is known for being able to reflect a large portion of incident light back towards an originating light source. Without a light source, however, beaded retroreflective sheeting can be difficult to see under some conditions.

Lightguides are used to facilitate distribution of light from a light source over an area much larger than the light source. Lightguides comprise optically transmissive materials and may have different forms such as slab, wedge, and pseudo-wedge forms. Most lightguides are designed to accept light at an edge surface and allow this light to propagate by total internal reflection between a back surface and an output surface, toward an opposing edge surface from which the light enters. Light is emitted uniformly from the output surface using extracting features that are positioned in various types of patterns on the output surface.

SUMMARY

Disclosed herein is an optical device having a light source, a viscoelastic lightguide and a retroreflective film suitable for retroreflecting light. Light from the light source enters the viscoelastic lightguide and is transported within the lightguide by total internal reflection. The optical device may have a "front lit" configuration such that light being transported within the lightguide is extracted and retroreflected by the film toward a viewer. In some cases, the optical device may have a "back lit" configuration such that light being transported within the lightguide is extracted and transmitted through the film toward a viewer. The retroreflective film may comprise beaded retroreflective sheeting such as that used in traffic signs and markings.

The optical device may be used as, for example, as a sign or marking, a license plate assembly, a tail light assembly for vehicles, a security laminate for protection of documents against tampering, or an illumination device.

These and other aspects of the invention are described in the detailed description below. In no event should the above summary be construed as a limitation on the claimed subject matter which is defined solely by the claims as set forth herein.

BRIEF DESCRIPTIONS OF DRAWINGS

Advantages and features of the invention may be more completely understood by consideration of the following figures in connection with the detailed description provided below. The figures are schematic drawings of various devices and articles and are not necessarily drawn to scale.

DETAILED DESCRIPTION

Figure 1:
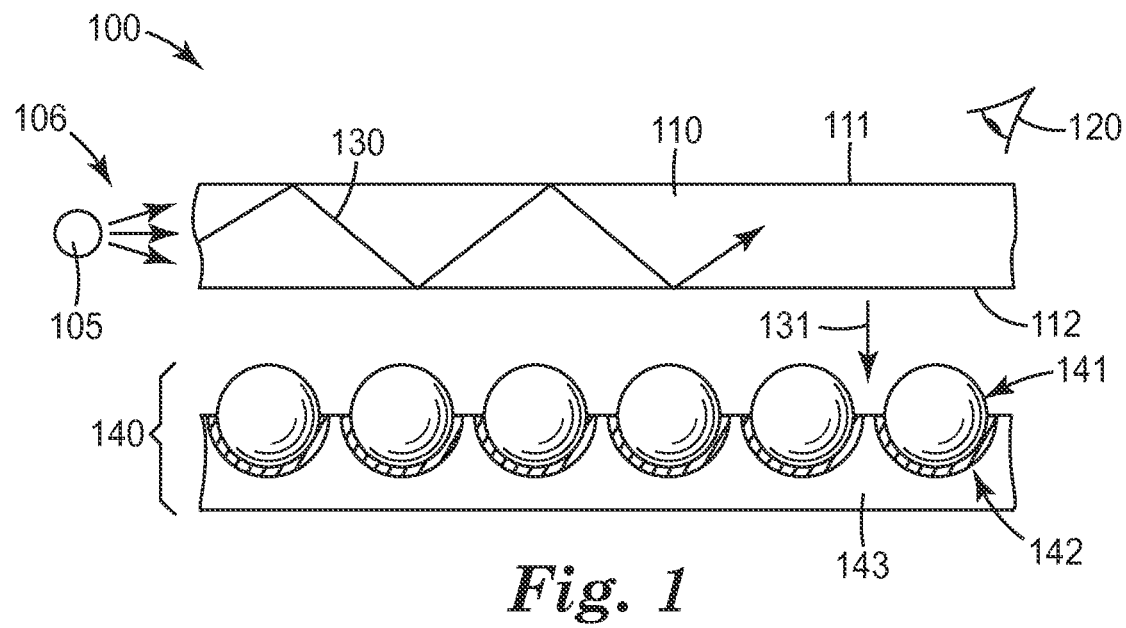
FIGS. 1-18 show schematic cross sections of exemplary optical devices having front lit configurations.

The optical device disclosed herein includes a light source that emits light, a viscoelastic layer for managing the light and a retroreflective film for redirecting the light back in the general direction of the light source. Optical article refers to the corresponding optical device without the light source.

The optical device may provide one or more advantages. For example, the viscoelastic lightguide is generally soft and compliant such that the light source may be easily coupled to the lightguide so that light can enter the lightguide. In some embodiments, the viscoelastic lightguide comprises a PSA which is generally tacky at room temperature. The light source may then be coupled to the viscoelastic lightguide such that it is adhered to the lightguide. This may facilitate assembly of the optical device itself or constructions in which the device is used.

Light is typically extracted from the viscoelastic lightguide at one or more desired locations or areas of the lightguide. In some embodiments, an extractor layer may be used to extract light from the viscoelastic lightguide. Again, due to the soft and compliant properties of the viscoelastic lightguide, the extractor layer may be easily coupled to the lightguide so that light can enter the layer. If the viscoelastic lightguide comprises a PSA, the extractor layer can be directly adhered to the lightguide without the need for additional materials to bond the two together. Light from the extractor layer can then be retroreflected by the retroreflective film such that the optical article is lit up by light originating from the light source.

In some embodiments, the retroreflective film may be used to extract light from the viscoelastic lightguide. Again, due to the soft and compliant properties of the viscoelastic lightguide, the retroreflective film may be easily coupled to the lightguide so that light can enter the retroreflective film. If the viscoelastic lightguide comprises a PSA, the retroreflective film can be directly adhered to the lightguide without the need for additional materials to bond the two together. Light from the viscoelastic lightguide can then be retroreflected by the retroreflective film such that the optical article is lit up by light originating from the light source.

The optical device may be used to provide light anywhere it is desired. The optical device may be designed for interior and/or exterior use. The optical device may be designed for household, commercial and/or industrial use. The optical device may be used and/or provided in a construction so that it is portable, i.e., it is a portable source of light. Lighted cards, tapes, signs, labels, stickers, cut-outs, etc. are examples of portable constructions that may be made using the optical device. The optical device may also be used and/or provided in a more stationary construction such as in a license plate assembly or as part of a lighting assembly used to provide lighting on the exterior of a vehicle, e.g., for tail lights, replacing tail light cavities and their lighting assemblies and which are very space consuming. The optical device may also be used to provide "light on demand", e.g., the light source may be activated selectively when certain conditions are met.

The optical device may also be very adaptable, even by a user, so that it can be used in different lighting forms and constructions. For example, optical articles may be provided in roll or sheet form that can be cut into various shapes and sizes. The light source may be interchangeable with the optical article, for example, if the light source should become unusable or if a different color of light is desired. Further, if used in a sign construction, graphics can be interchanged, for example, if one would like to update an advertisement. The optical device can be used with a variety of retroreflective films, and the films can be either front lit or back lit relative to the position of a viewer.

The optical device may provide many more advantages. The optical device can be used to provide light that is bright, diffuse, uniform and/or concentrated over particular areas. The optical device may provide advantages by being thin, flexible and/or lightweight. The viscoelastic lightguide may be tiled to light large areas of retroreflective film which may be made easier if the lightguides can be stuck together. Due to its viscoelastic properties, the viscoelastic lightguide may also dampen stresses experienced by the optical device or construction in which the device is used. The viscoelastic lightguide, when disposed on a substrate, may be removable and/or repositionable over time. The optical device may also provide advantages related to cost, because it can be made from commercially available light sources, viscoelastic materials and retroreflective films. Additional advantages are described below.

The behavior of light with respect to the optical devices and articles disclosed herein can be described using principles of geometric optics. These principles are well known and are not presented here; a more detailed description can be found in the Sherman et al. references cited above. In general, one may apply the law of refraction and the principle of total internal reflection in conjunction with ray tracing techniques to determine theoretically how varying three dimensional structure, material composition, layer construction, angular distribution of light, etc. can affect the behavior of light for the optical devices and articles disclosed herein.

FIG. 1 shows a schematic cross section of exemplary optical device 100. This embodiment is an example of a front lit configuration in which viscoelastic lightguide 110 is on top of retroreflective film 140 or closer than the retroreflective film to the viewer as indicated by eye 120. Light source 105 is positioned relative to viscoelastic lightguide 110 such that light emitted by the light source enters viscoelastic lightguide 110 and is transported within the lightguide by total internal reflection. Light emitted by the light source is represented by rays 106 which enter viscoelastic lightguide 110 through an input surface (not shown) adapted to receive light from the light source. Light within the viscoelastic lightguide is represented by single ray 130 which is transported by total internal reflection. At least a portion of the viscoelastic lightguide has optically smooth surface 111 and/or 112.

Light emitted by the light source enters the viscoelastic lightguide and is transported within the lightguide by total internal reflection. In general, total internal reflection occurs when light having a particular angular component or distribution is incident upon an interface at one or more angles greater than the critical angle $\theta_c$. An optically smooth surface, as used herein, means that the surface is smooth enough such that light incident upon the surface is not affected undesirably by the surface, e.g., the surface is free of defects having at least one dimension larger than the wavelength of the incident light. The optically smooth surface allows at least some of the light entering the viscoelastic lightguide to be reflected at the surface such that this light continues to propagate within the layer according to the principle of total internal reflection. For reflection of light incident on an optically smooth surface, the observed reflection angle is within about 10° of the calculated reflection angle. Total internal reflection occurs if a predetermined amount, or at least within about 10% of a predetermined amount, of light does not escape the viscoelastic lightguide unless it is intentionally extracted from the lightguide.

The viscoelastic lightguide may have opposing major surfaces that are substantially unstructured as shown in FIG. 1 for surfaces 111 and 112. These major surfaces may also be structured with a plurality of features, or one major surface may be substantially unstructured and the other structured with a plurality of features.

A structured surface of the viscoelastic lightguide comprises a plurality of features which may include protrusions and/or depressions having lenticular, prismatic, ellipsoidal, conical, parabolic, pyramidal, square, or rectangular shapes, or a combination thereof. Features comprising lenses are particularly useful for directing light to a preferred angular distribution. Features comprising linear prisms or elongated prisms are also particularly useful. Other exemplary features comprise protrusions and/or depressions having elongated, irregular, variably sloped lenticular, or random columnar shapes, or a combination thereof. Hybrids of any combination of shapes may be used, for example, elongated parabolic, pyramidal prismatic, rectangular-based prismatic, and rounded-tip prismatic shapes. The features may comprise random combinations of shapes.

Sizes of the features may be described by their overall shapes in three dimensions. In some embodiments, each feature may have a dimension of from about 1 to about 100 um, for example, from about 5 to about 70 um. The features of a surface may have all the same shape, but the sizes of the shapes may vary in at least one dimension. The features of a surface may have different shapes, and the sizes of these features may or may not vary in any given dimension.

Surface structures of the features may also be varied. Surface structure of a feature generally refers to the sub-structure of the feature. Exemplary surface structures include optically smooth surfaces, irregular surfaces, patterned surfaces, or a combination thereof. For a given surface having a plurality of features, all or some of the features may have the same surface structure, or they may all be different. The surface structure of a feature may vary over portions of the feature. An optically smooth surface of a feature may form part of the optically smooth surface of the viscoelastic lightguide. The optically smooth surfaces of the feature and the viscoelastic lightguide may be continuous or discontinuous with each other. If a plurality of features is used, the surfaces of some features may be completely optically smooth or some may be partially optically smooth.

The number of features, if used, for a given structured surface is at least one. A plurality of features, meaning at least two, may also be used. In general, any number of features may be included, e.g., 0, 1, 2, 3, 4 or 5 features; greater than 1, greater than 10, greater than 20, greater than 30, greater than 40, greater than 50, greater than 100, greater than 200, greater than 500, greater than 1000, or greater than 2000 features; or from about 1 to about 10, from about 1 to about 20, from about 1 to about 30, from about 1 to about 40, from about 1 to about 50, from about 1 to about 100, from about 1 to about 200, from about 1 to about 500, from about 1 to about 1000, or from about 1 to about 2000 features.

The features may be randomly arranged, arranged in some type of regular pattern, or both. The distance between features may also vary. The features may be discreet or they may overlap. The features may be arranged in close proximity to one another, in substantial contact with each other, immediately adjacent each other, or some combination thereof. A useful distance between features is up to about 10 um, or from about 0.05 um to about 10 um. The features may be offset with respect to one another, angularly as well as transversely. The areal density of the features may change over the length, width, or both.

The features may be used to control the amount and/or direction of light that is extracted from the retroreflective film. The features may be arranged to obtain a desired optical effect. The features may be arranged to provide an image, extract light uniformly or as a gradient from the viscoelastic lightguide, hide discrete light sources, or reduce Moiré. This can be carried out generally by varying the shape, size, surface structure, and/or orientation of the features. If a plurality of features is used, then the number and/or arrangement of the features may be varied, as well as the orientation of the features relative to each other.

The shape of a feature may change the angular component of light which can increase or decrease the amount of light that is extracted from the viscoelastic layer. This may be the case if light propagates by total internal reflection within the viscoelastic lightguide and strikes a surface of a feature at an angle less than, equal to, or greater than the critical angle for the viscoelastic lightguide and an adjacent substrate which may or may not be the retroreflective film. The amount of light that is extracted from the viscoelastic lightguide may increase or decrease accordingly. The size of a feature may be changed such that more or less light can reflect off a surface of the feature, thus increasing or decreasing the amount of light that is extracted from the viscoelastic layer. The surface structure of a feature may be used to control the distribution of light that is extracted from the viscoelastic layer. Light having a particular angular distribution may strike a feature and be extracted uniformly and/or randomly. Light may also be extracted uniformly and in a pattern, or randomly and in a pattern.

The viscoelastic lightguide is generally in contact with at least one medium. The medium may comprise air or a substrate, and substrates may be the retroreflective film, polymeric film, metal, glass, and/or fabric. Particular substrates are described below for a variety of exemplary constructions. For the purpose of convenience, a viscoelastic lightguide in contact with a substrate is described below, but this substrate may comprise any type of medium including a polymeric film, the retroreflective film or air.

Given a particular substrate in contact with the viscoelastic lightguide, the amount of light extracted from the lightguide and by the substrate may be from about 10 to about 50%, from about 20 to about 50%, from about 30 to about 50%, from about 50 to about 70%, from about 50 to about 80%, or from about 10 to about 90% relative to the total amount of light that enters the lightguide.

The transmittance angle for light extracted from the viscoelastic lightguide by the retroreflective film or substrate may be from greater than about 5° to less than about 95°, greater than about 5° to less than about 60°, or greater than about 5° to less than about 30°.

The viscoelastic lightguide may have a refractive index greater than that of the retroreflective film or the substrate. The refractive index of the viscoelastic lightguide may be greater than about 0.002, greater than about 0.005, greater than about 0.01, greater than about 0.02, greater than about 0.03, greater than about 0.04, greater than about 0.05, greater than about 0.1, greater than about 0.2, greater than about 0.3, greater than about 0.4, or greater than about 0.5, as compared to the refractive index of the retroreflective film or substrate.

The viscoelastic lightguide may have a refractive index less than that of the retroreflective film or substrate. The refractive index of the viscoelastic lightguide may be less than about 0.002, less than about 0.005, less than about 0.01, less than about 0.02, less than about 0.03, less than about 0.04, less than about 0.05, less than about 0.1, less than about 0.2, less than about 0.3, less than about 0.4, or less than about 0.5, as compared to the refractive index of the retroreflective film or substrate.

The viscoelastic lightguide and the retroreflective film or substrate may have the same or nearly the same refractive index such that light can be extracted into the retroreflective film or substrate with little or no change to the light. The refractive index difference of the viscoelastic lightguide and the retroreflective film or substrate may be from about 0.001 to less than about 0.002.

The refractive index difference of the viscoelastic lightguide and the retroreflective film or substrate may be from about 0.002 to about 0.5, from about 0.005 to about 0.5, from about 0.01 to about 0.5, from about 0.02 to about 0.5, from about 0.03 to about 0.5, from about 0.04 to about 0.5, from about 0.05 to about 0.5, from about 0.1 to about 0.5, from about 0.2 to about 0.5, from about 0.3 to about 0.5, or from about 0.4 to about 0.5.

The viscoelastic lightguide may have any bulk three-dimensional shape as is needed for a given application. The viscoelastic lightguide may be in the form of a square or rectangular layer, sheet, film, etc. The viscoelastic lightguide may be cut or divided into shapes as described below.

The thickness of the viscoelastic lightguide is not particularly limited as long as it can function as desired. The thickness of the viscoelastic lightguide may be selected based on or in conjunction with the light source. For example, design parameters may limit or even require that a particular light source(s) be used, and there may be a minimum amount, or range of amounts, of light that is required to enter the viscoelastic lightguide. Thus, the thickness of the viscoelastic lightguide may be selected so that the required amount of light from a given light source can enter the lightguide. A maximum thickness of the viscoelastic lightguide may be required for use in optical devices designed to be particularly thin. Exemplary thicknesses for the viscoelastic lightguide range from about 0.4 mil to about 1000 mil, from about 1 mil to about 300 mil, from about 1 mil to about 60 mil, or from about 0.5 mil to about 30 mil.

The amount and direction of light extracted from the viscoelastic lightguide may be controlled, at the very least, by the shape, size, number, arrangement, etc. of the features, the refractive indices of the viscoelastic lightguide and any medium with which the lightguide is in contact, the shape and size of the viscoelastic lightguide, and the angular distribution of light that is allowed to enter the viscoelastic lightguide. These variables may be selected such that from about 10 to about 50%, from about 20 to about 50%, from about 30 to about 50%, from about 50 to about 70%, from about 50 to about 80%, or from about 10 to about 90% of light is extracted from the viscoelastic lightguide relative to the total amount of light that enters the lightguide.

The viscoelastic lightguide comprises one or more viscoelastic materials. In general, viscoelastic materials exhibit both elastic and viscous behavior when undergoing deformation. Elastic characteristics refer to the ability of a material to return to its original shape after a transient load is removed. One measure of elasticity for a material is referred to as the tensile set value which is a function of the elongation remaining after the material has been stretched and subsequently allowed to recover (destretch) under the same conditions by which it was stretched. If a material has a tensile set value of 0%, then it has returned to its original length upon relaxation, whereas if the tensile set value is 100%, then the material is twice its original length upon relaxation. Tensile set values may be measured using ASTM D412. Useful viscoelastic materials may have tensile set values of greater than about 10%, greater than about 30%, or greater than about 50%; or from about 5 to about 70%, from about 10 to about 70%, from about 30 to about 70%, or from about 10 to about 60%.

Viscous materials that are Newtonian liquids have viscous characteristics that obey Newton's law which states that stress increases linearly with shear gradient. A liquid does not recover its shape as the shear gradient is removed. Viscous characteristics of useful viscoelastic materials include flowability of the material under reasonable temperatures such that the material does not decompose.

The viscoelastic lightguide may have properties that facilitate sufficient contact or wetting with at least a portion of the retroreflective film or substrate such that the lightguide and the film or substrate are optically coupled. Light can then be extracted from the viscoelastic lightguide by the film or substrate. The viscoelastic lightguide is generally soft, compliant and flexible. Thus, the viscoelastic lightguide may have an elastic modulus (or storage modulus G') such that sufficient contact can be obtained, and a viscous modulus (or loss modulus G") such that the layer doesn't flow undesirably, and a damping coefficient (G"/G', tan D) for the relative degree of damping of the layer.

Useful viscoelastic materials may have a storage modulus, G', of less than about 300,000 Pa, measured at 10 rad/sec and a temperature of from about 20 to about 22° C. Useful viscoelastic materials may have a storage modulus, G', of from about 30 to about 300,000 Pa, measured at 10 rad/sec and a temperature of from about 20 to about 22° C. Useful viscoelastic materials may have a storage modulus, G', of from about 30 to about 150,000 Pa, measured at 10 rad/sec and a temperature of from about 20 to about 22° C. Useful viscoelastic materials may have a storage modulus, G', of from about 30 to about 30,000 Pa, measured at 10 rad/sec and a temperature of from about 20 to about 22° C. Useful viscoelastic materials may have a storage modulus, G', of from about 30 to about 150,000 Pa, measured at 10 rad/sec and a temperature of from about 20 to about 22° C., and a loss tangent (tan d) of from about 0.4 to about 3. Viscoelastic properties of materials can be measured using Dynamic Mechanical Analysis according to, for example, ASTM D4065, D4440, and D5279.

In some embodiments, the viscoelastic lightguide comprises a PSA layer as described in the Dalquist criterion line (as described in Handbook of Pressure Sensitive Adhesive Technology, Second Ed., D. Satas, ed., Van Nostrand Reinhold, New York, 1989.)

The viscoelastic lightguide may have a particular peel force or at least exhibit a peel force within a particular range. For example, the viscoelastic lightguide may have a 90° peel force of from about 50 to about 3000 g/in, from about 300 to about 3000 g/in, or from about 500 to about 3000 g/in. Peel force may be measured using a peel tester from IMASS.

In some embodiments, the viscoelastic lightguide comprises an optically clear lightguide having high light transmittance of from about 80 to about 100%, from about 90 to about 100%, from about 95 to about 100%, or from about 98 to about 100% over at least a portion of the visible light spectrum (about 400 to about 700 nm). In some embodiments, the viscoelastic lightguide has a haze value of less than about 5%, less than about 3%, or less than about 1%. In some embodiments, the viscoelastic lightguide has a haze value of from about 0.01 to less than about 5%, from about 0.01 to less than about 3%, or from about 0.01 to less than about 1%. Haze values in transmission can be determined using a haze meter according to ASTM D1003.

In some embodiments, the viscoelastic lightguide comprises an optically clear lightguide having high light transmittance and a low haze value. High light transmittance may be from about 90 to about 100%, from about 95 to about 100%, or from about 99 to about 100% over at least a portion of the visible light spectrum (about 400 to about 700 nm), and haze values may be from about 0.01 to less than about 5%, from about 0.01 to less than about 3%, or from about 0.01 to less than about 1%. The viscoelastic lightguide may also have a light transmittance of from about 50 to about 100%.

In some embodiments, the viscoelastic lightguide is hazy and diffuses light, particularly visible light. A hazy viscoelastic lightguide may have a haze value of greater than about 5%, greater than about 20%, or greater than about 50%. A hazy viscoelastic lightguide may have a haze value of from about 5 to about 90%, from about 5 to about 50%, or from about 20 to about 50%.

In some embodiments, the viscoelastic lightguide may be translucent in that it reflects and transmits light.

The viscoelastic lightguide may have a refractive index in the range of from about 1.3 to about 2.6, 1.4 to about 1.7, or from about 1.5 to about 1.7. The particular refractive index or range of refractive indices selected for the viscoelastic lightguide may depend on the overall design of the optical device and the particular application in which the device may be used.

The viscoelastic lightguide generally comprises at least one polymer. The viscoelastic lightguide may comprise at least one PSA. PSAs are useful for adhering together adherends and exhibit properties such as: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process. A quantitative description of PSAs can be found in the Dahlquist reference cited above.

Useful PSAs are described in detailed in the Sherman et al. references cited above. Only a brief description of useful PSAs is included here. Exemplary poly(meth)acrylate PSAs are derived from: monomer A comprising at least one monoethylenically unsaturated alkyl (meth)acrylate monomer and which contributes to the flexibility and tack of the PSA; and monomer B comprising at least one monoethylenically unsaturated free-radically copolymerizable reinforcing monomer which raises the Tg of the PSA and contributes to the cohesive strength of the PSA. Monomer B has a homopolymer glass transition temperature (Tg) higher than that of monomer A. As used herein, (meth)acrylic refers to both acrylic and methacrylic species and likewise for (meth)acrylate.

Preferably, monomer A has a homopolymer Tg of no greater than about 0° C. Preferably, the alkyl group of the (meth)acrylate has an average of about 4 to about 20 carbon atoms. Examples of monomer A include 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, isononyl acrylate, and mixtures thereof. The alkyl group can comprise ethers, alkoxy ethers, ethoxylated or propoxylated methoxy (meth)acrylates. Monomer A may comprise benzyl acrylate.

Preferably, monomer B has a homopolymer Tg of at least about 10° C., for example, from about 10 to about 50° C. Monomer B may comprise (meth)acrylic acid, (meth)acrylamide and N-monoalkyl or N-dialkyl derivatives thereof, or a (meth)acrylate. Examples of monomer B include N-hydroxyethyl acrylamide, diacetone acrylamide, N,N-dimethyl acrylamide, N,N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, and N-octyl acrylamide. Other examples of monomer B include itaconic acid, crotonic acid, maleic acid, fumaric acid, 2,2-(diethoxy)ethyl acrylate, 2-hydroxyethyl acrylate or methacrylate, 3-hydroxypropyl acrylate or methacrylate, methyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, N-vinyl caprolactam, and mixtures thereof.

In some embodiments, the (meth)acrylate PSA is formulated to have a resultant Tg of less than about 0° C. and more preferably, less than about −10° C. Such (meth)acrylate PSAs include about 60 to about 98% by weight of at least one monomer A and about 2 to about 40% by weight of at least one monomer B, both relative to the total weight of the (meth) acrylate PSA copolymer.

Useful PSAs include natural rubber-based and synthetic rubber-based PSAs. Rubber-based PSAs include butyl rubber, copolymers of isobutylene and isoprene, polyisobutylene, homopolymers of isoprene, polybutadiene, and styrene/butadiene rubber. These PSAs may be inherently tacky or they may require tackifiers. Tackifiers include rosins and hydrocarbon resins.

Useful PSAs include thermoplastic elastomers. These PSAs include styrene block copolymers with rubbery blocks of polyisoprene, polybutadiene, poly(ethylene/butylene), poly(ethylene-propylene. Resins that associate with the rubber phase may be used with thermoplastic elastomer PSAs if the elastomer itself is not tacky enough. Examples of rubber phase associating resins include aliphatic olefin-derived resins, hydrogenated hydrocarbons, and terpene phenolic resins. Resins that associate with the thermoplastic phase may be used with thermoplastic elastomer PSAs if the elastomer is not stiff enough. Thermoplastic phase associating resins include polyaromatics, coumarone-indene resins, resins derived from coal tar or petroleum.

Useful PSAs include tackified thermoplastic-epoxy pressure sensitive adhesives as described in U.S. Pat. No. 7,005, 394 (Ylitalo et al.). These PSAs include thermoplastic polymer, tackifier and an epoxy component.

Useful PSAs include polyurethane pressure sensitive adhesive as described in U.S. Pat. No. 3,718,712 (Tushaus). These PSAs include crosslinked polyurethane and a tackifier.

Useful PSAs include polyurethane acrylate as described in US 2006/0216523 (Shusuke). These PSAs include urethane acrylate oligomer, plasticizer and an initiator.

Useful PSAs include silicone PSAs such as polydiorganosiloxanes, polydiorganosiloxane polyoxamides and silicone urea block copolymers described in U.S. Pat. No. 5,214, 119 (Leir, et al). The silicone PSAs may be formed from a hyrosilylation reaction between one or more components having silicon-bonded hydrogen and aliphatic unsaturation. The silicone PSAs may include a polymer or gum and an optional tackifying resin. The tackifying resin may comprise a three-dimensional silicate structure that is endcapped with trialkylsiloxy groups.

Useful silicone PSAs may also comprise a polydiorganosiloxane polyoxamide and an optional tackifier as described in U.S. Pat. No. 7,361,474 (Sherman et al.) incorporated herein by reference. Useful tackifiers include silicone tackifying resins as described in U.S. Pat. No. 7,090,922 B2 (Zhou et al.) incorporated herein by reference.

The PSA may be crosslinked to build molecular weight and strength of the PSA. Crosslinking agents may be used to form chemical crosslinks, physical crosslinks or a combination thereof, and they may be activated by heat, UV radiation and the like.

In some embodiments, the viscoelastic lightguide comprises a PSA formed from a (meth)acrylate block copolymer as described in U.S. Pat. No. 7,255,920 B2 (Everaerts et al.). In general, these (meth)acrylate block copolymers comprise: at least two A block polymeric units that are the reaction product of a first monomer composition comprising an alkyl methacrylate, an aralkyl methacrylate, an aryl methacrylate, or a combination thereof, each A block having a Tg of at least 50° C., the methacrylate block copolymer comprising from 20 to 50 weight percent A block; and at least one B block polymeric unit that is the reaction product of a second monomer composition comprising an alkyl (meth)acrylate, a heteroalkyl (meth)acrylate, a vinyl ester, or a combination thereof, the B block having a Tg no greater than 20° C., the (meth)acrylate block copolymer comprising from 50 to 80 weight percent B block; wherein the A block polymeric units are present as nanodomains having an average size less than about 150 nm in a matrix of the B block polymeric units.

In some embodiments, the viscoelastic lightguide comprises a clear acrylic PSA, for example, those available as transfer tapes such as VHB™ Acrylic Tape 4910F from 3M Company and 3M™ Optically Clear Laminating Adhesives (8140 and 8180 series).

In some embodiments, the viscoelastic lightguide comprises a PSA formed from at least one monomer containing a substituted or an unsubstituted aromatic moiety as described in U.S. Pat. No. 6,663,978 B1 (Olson et al.).

In some embodiments, the viscoelastic lightguide comprises a copolymer as described in U.S. Ser. No. 11/875,194 (63656US002, Determan et al.), comprising (a) monomer units having pendant bephenyl groups and (b) alkyl (meth)acrylate monomer units.

In some embodiments, the viscoelastic lightguide comprises a copolymer as described in U.S. Provisional Application Ser. No. 60/983,735 (63760US002, Determan et al.), comprising (a) monomer units having pendant carbazole groups and (b) alkyl (meth)acrylate monomer units.

In some embodiments, the viscoelastic lightguide comprises an adhesive as described in U.S. Provisional Application Ser. No. 60/986,298 (63108US002, Schaffer et al.), comprising a block copolymer dispersed in an adhesive matrix to form a Lewis acid-base pair. The block copolymer comprises an AB block copolymer, and the A block phase separates to form microdomains within the B block/adhesive matrix. For example, the adhesive matrix may comprise a copolymer of an alkyl (meth)acrylate and a (meth)acrylate having pendant acid functionality, and the block copolymer may comprise a styrene-acrylate copolymer. The microdomains may be large enough to forward scatter incident light, but not so large that they backscatter incident light. Typically these microdomains are larger than the wavelength of visible light (about 400 to about 700 nm). In some embodiments the microdomain size is from about 1.0 to about 10 um.

The viscoelastic lightguide may comprise a stretch releasable PSA. Stretch releasable PSAs are PSAs that can be removed from a substrate if they are stretched at or nearly at a zero degree angle. In some embodiments, the viscoelastic lightguide or a stretch release PSA used in the viscoelastic lightguide has a shear storage modulus of less than about 10 MPa when measured at 1 rad/sec and −17° C., or from about 0.03 to about 10 MPa when measured at 1 rad/sec and −17° C. Stretch releasable PSAs may be used if disassembling, reworking, or recycling is desired.

In some embodiments, the stretch releasable PSA may comprise a silicone-based PSA as described in U.S. Pat. No. 6,569,521 B1 (Sheridan et al.) or U.S. Provisional Application Nos. 61/020,423 (63934US002, Sherman et al.) and 61/036,501 (64151US002, Determan et al.). Such silicone-based PSAs include compositions of an MQ tackifying resin and a silicone polymer. For example, the stretch releasable PSA may comprise an MQ tackifying resin and an elastomeric silicone polymer selected from the group consisting of urea-based silicone copolymers, oxamide-based silicone copolymers, amide-based silicone copolymers, urethane-based silicone copolymers, and mixtures thereof.

In some embodiments, the stretch releasable PSA may comprise an acrylate-based PSA as described in U.S. Provisional Application Nos. 61/141,767 (64418US002, Yamanaka et al.) and 61/141,827 (64935US002, Tran et al.) Such acrylate-based PSAs include compositions of an acrylate, an inorganic particle and a crosslinker. These PSAs can be a single or multilayer.

The viscoelastic lightguide may comprise an aerogel. An aerogel is a low-density solid state material derived from gel in which the liquid component of the gel has been replaced with air. Silica, alumina and carbon aerogels are exemplary aerogels that may be used.

The viscoelastic lightguide can optionally include one or more additives such as filler, particles, plasticizers, chain transfer agents, initiators, antioxidants, stabilizers, fire retardants, viscosity modifying agents, foaming agents, antistats, colorants such as dyes and pigments, fluorescent dyes and pigments, phosphorescent dyes and pigments, fibrous reinforcing agents, and woven and non-woven fabrics.

The viscoelastic lightguide may be made hazy and/or diffusive by including particles such as nanoparticles (diameter less than about 1 um), microspheres (diameter 1 um or greater), or fibers. Exemplary nanoparticles include $TiO_2$. Haze and diffusive properties can also be incorporated into the viscoelastic lightguide by incorporating bubbles into the lightguide. The bubbles may have a diameter of from about 0.01 to about 50 um. Bubbles may be introduced by adding, e.g., foaming agents. Examples of additional additives that may be added to the viscoelastic lightguide include glass beads, reflective particles, and conductive particles. In some embodiments, the viscoelastic lightguide may comprise a PSA matrix and particles as described in U.S. Provisional Application No. 61/097,685 (64740US002, Sherman et al.), comprising an optically clear PSA and silicon resin particles having a refractive index less than that of the PSA, and incorporated herein by reference. In some embodiments, the presence of particles, bubbles, air, etc. increases the scatter and uniformity of light.

Exemplary optical device 100 further comprises retroreflective film 140 having layer of transparent microspheres 141 and reflective material 142 disposed behind the microspheres. In general, the phrase "behind the microspheres" is in relation to eye 120. In general, "transparent" refers to being capable of transmitting light. Light propagating within the viscoelastic lightguide may be extracted, as shown by ray 131, from the lightguide and retroreflected by retroreflective film 140.

Figure 2:
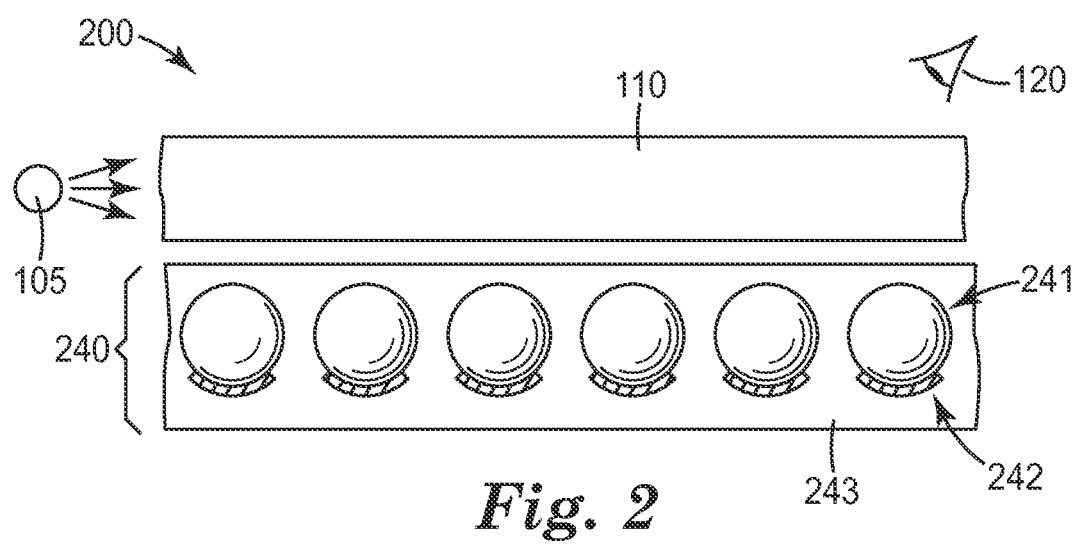

The retroreflective film may comprise a binder for supporting the transparent microspheres. For example, retroreflective film 140 further comprises binder 143, wherein the transparent microspheres are partially embedded in the binder, and the reflective material is disposed between the microspheres and the binder. In some embodiments, the microspheres may be completely embedded in a binder. In this case, the binder needs to be transparent so that light can reach the transparent microspheres. FIG. 2 shows a schematic cross section of exemplary optical device 200 having a front lit configuration. Retroreflective film 240 comprises layer of transparent microspheres 241 completely embedded in transparent binder 243 with reflective material 242 disposed behind the microspheres and between the microspheres and the transparent binder.

In general, a retroreflective film is suitable for retroreflecting light if light incident upon the film is reflected back in one or more useful directions relative to the direction of the incident light. Light may be reflected back in a direction that is 180° or nearly 180° from that of the incident light. Light may be reflected back in one or more directions that are anywhere from about 45° to about 180° relative to the direction of the incident light.

The retroreflective film may have opposing major surfaces that are substantially unstructured, structured with a plurality of features, or a combination thereof. In FIG. 1, the upper surface (adjacent the viscoelastic lightguide) of retroreflective film 140 includes surfaces of the transparent microspheres and thus is structured with a plurality of lenticular features. This upper surface also comprises the reflective material and the binder which together form a substantially planar surface between the lenticular features. The lower surface opposite the upper surface is substantially unstructured. In FIG. 2, both upper and lower surfaces of retroretroreflective film 240 are substantially unstructured. A surface of the retroreflective film may comprise any one of the plurality of features described above for the viscoelastic lightguide.

The retroreflective film may comprise retroreflective sheeting sometimes referred to as beaded retroreflective sheeting. This type of sheeting is employed in many traffic safety and personal safety articles such as road signs, barricades, license plates, pavement markers and marking tape, as well as retroreflective tapes for vehicles and clothing. Exemplary retroreflective sheeting is described in Tung et al.; U.S. Pat. No. 2,440,584 (Heltzer et al.); U.S. Pat. No. 5,064,272 (Bailey et al.); U.S. Pat. No. 4,082,426 (Brown); U.S. Pat. No. 4,418,110 (May et al.); US 2007/0110960 (Frey et al.); and U.S. Provisional Application No. 61/107,586 filed on Oct. 22, 2008 (64846US002, Smith et al.); all of which are incorporated herein by reference.

The retroreflective film comprises transparent microspheres. In general, transparent means that a given material is capable of transmitting light. The transparent microspheres may have a diameter of from about 50 to about 200 um, or from about 50 to about 100 um. Light extracted from the viscoelastic lightguide enters the transparent microspheres so that the light can be retroreflected. Thus, the transparent microspheres are typically extractor elements. They may have a refractive index greater than that of the material(s) from which they extract light, e.g., from about 1.4 to about 2.5, or from about 1.8 to about 2.5. The transparent microspheres may comprise glass, glass-ceramic, and/or polymer.

The reflective material disposed behind the transparent microspheres is used to facilitate retroreflection of light within the microspheres. The reflective material may be positioned anywhere behind the transparent microspheres as long as the optical device can function as desired. Reflective material may be in front of, or on the side of, the transparent microspheres as long as the optical device can function as desired. The reflective material may be disposed as a hemispherical shell that covers half or nearly half of each microsphere as shown in FIG. 1, or reflective material may be disposed on a small portion behind each microsphere as shown in FIG. 2. The reflective material may be discontinuous across the retroreflective film as shown in FIGS. 1 and 2, discontinuous meaning that there are areas between the transparent microspheres that do not comprise the reflective material.

Figure 3:
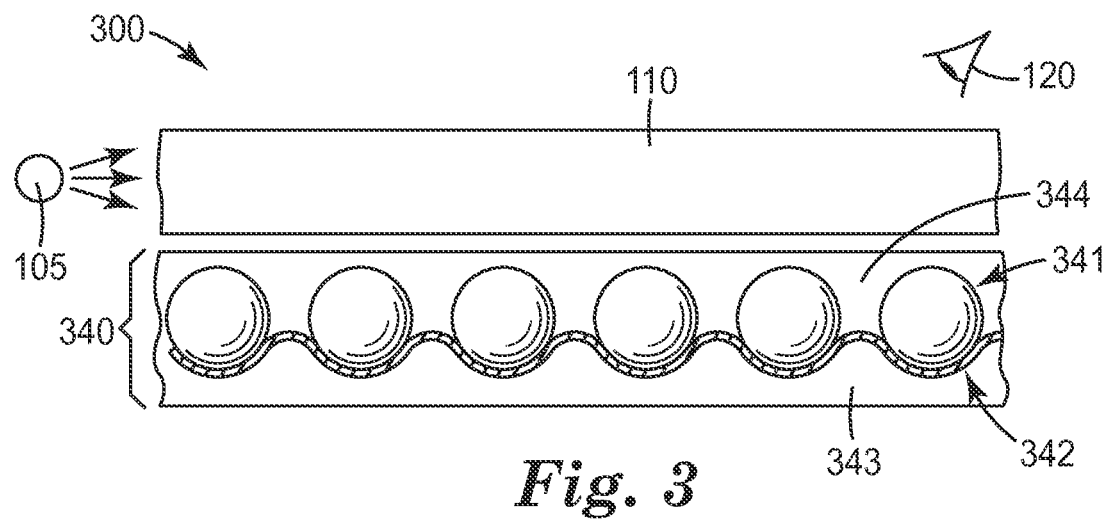
Figure 4:
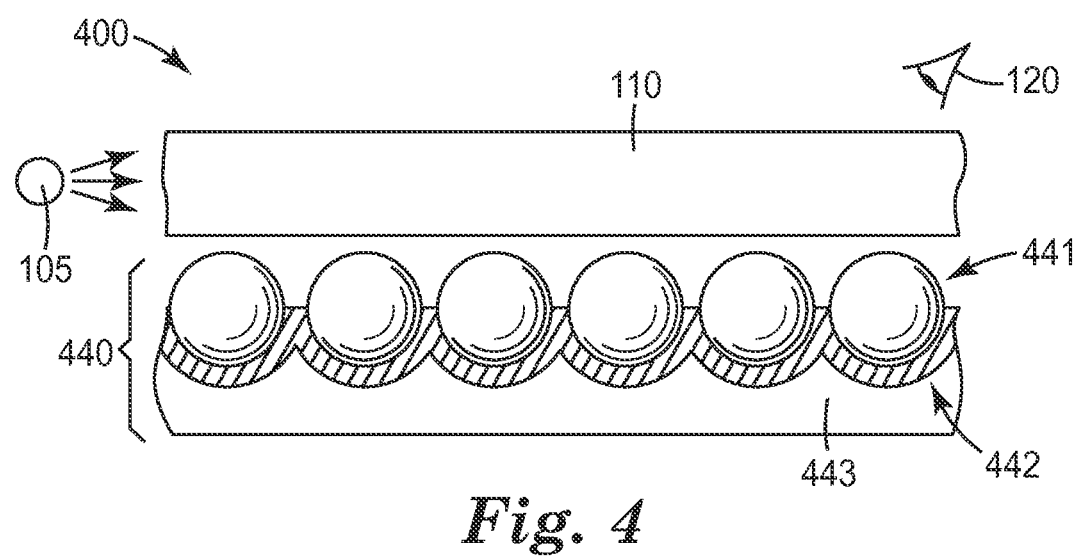

The reflective material may be in the form of a layer that may be structured on one or both sides. FIG. 3 shows a schematic cross section of exemplary optical device 300 comprising viscoelastic lightguide 110 on top of retroreflective film 340. Optical device 300 further comprises retroreflective film 340 having layer of transparent microspheres 341 and reflective material 342 disposed as a layer behind the microspheres. FIG. 4 shows a schematic cross section of exemplary optical device 400 comprising viscoelastic lightguide 110 on top of retroreflective film 440. Optical device 400 further comprises retroreflective film 440 having layer of transparent microspheres 441 and reflective material 442 disposed as a layer behind the microspheres. The optical devices of FIGS. 3 and 4 comprise lower binder layers 343 and 443, respectively, and FIG. 3 comprises upper binder layer 344. These binder layers are described below.

Figure 5:
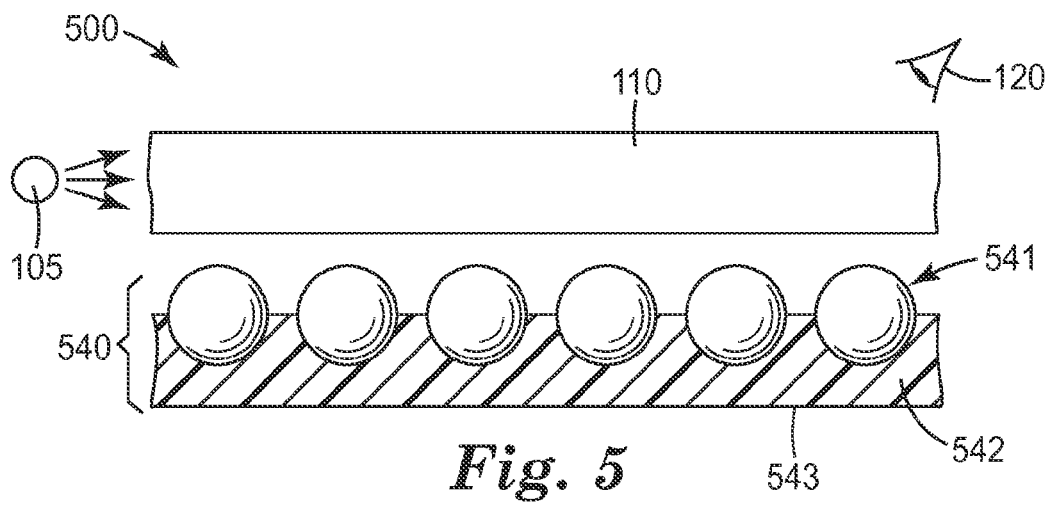

The reflective material may function as a binder such that it supports the transparent microspheres. This reflective binder may be a lower binder layer. FIG. 5 shows a schematic cross section of exemplary optical device 500 comprising viscoelastic lightguide 110 and retroreflective film 540 having layer of transparent microspheres 541 and reflective material 542 disposed as a layer behind the microspheres. The transparent microspheres are partially embedded in the reflective binder.

Figure 6:
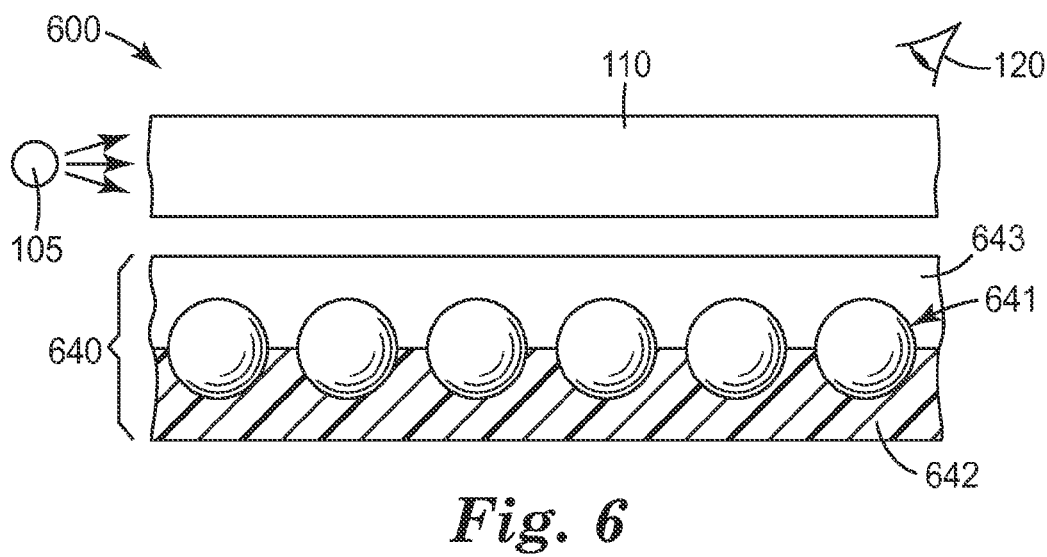

The retroreflective film may further comprise a transparent binder, wherein the transparent microspheres are at least partially embedded in the transparent binder, and the transparent binder is disposed between the viscoelastic lightguide and the layer of transparent microspheres. FIG. 6 shows a schematic cross section of exemplary optical device 600 comprising viscoelastic lightguide 110 and retroreflective film 640 having layer of transparent microspheres 641 and reflective material 642 disposed as a layer behind the microspheres. Optical device 600 comprises upper binder layer 643 which is transparent. In general, the upper transparent binder layer and the reflective material may be in direct contact as is shown in FIG. 6.

The reflective material may be selected to reflect a certain amount of light that is propagating within the transparent microspheres. The amount of light reflected by the reflective material may be from about 10 to about 50%, from about 50 to about 70%, from about 70 to about 100%, or from about 80 to about 100% relative to the total amount of light that enters the retroreflective layer.

The reflective material may function as a specular reflector wherein the reflection angle of light is within about 16° of the incident angle. A specular reflector may be fully or near fully specular as a reflector over some range of incident angles. Also, specular reflectors may be from about 85 to about 100% reflective across a particular region of the electromagnetic spectrum, for example, the visible region.

The reflective material may function as a diffuse reflector wherein light of a given incident angle reflects with multiple reflection angles such that the light is scattered, with at least some of the reflection angles being greater than about 16° of the incident angle. A diffuse reflector may be fully or near fully reflective over some range of incident angles. Also, diffuse reflectors may be from about 85 to about 100% reflective across a particular region of the electromagnetic spectrum, for example, the visible region.

The reflective material may comprise a metal such as aluminum or silver. These materials may be vapor coated. The reflective material may comprise a polymer. The reflective material may comprise polymers such as acrylates and methacrylates and may have particles for diffusing light. The reflective material may be a paint or an enamel.

The retroreflective film may comprise one or more polymer layers that may function as binders. For example, in FIG. 3, retroreflective film 340 comprises upper binder 344 and lower binder 343. In general, "upper" and "lower" are with respect to the layer of transparent microspheres and the position of the viewer as indicated by eye 120. For optical device 300, the binder layers are separated by reflective layer 342. For optical device 600, the binder layers are in direct contact with each other. The retroreflective film may comprise only a lower binder layer; optical devices 400 and 500 have lower binder layers 443 and 542, respectively.

Figure 7:
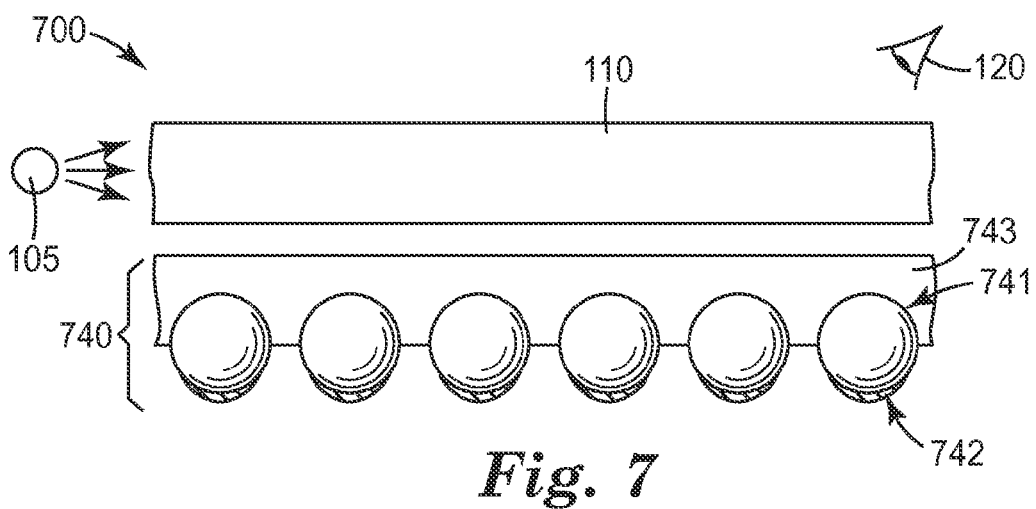

The retroreflective film may comprise only an upper binder layer. The retroreflective film may comprise a transparent binder, wherein the transparent microspheres are at least partially embedded in the transparent binder, and the transparent binder is disposed between the viscoelastic lightguide and the layer of transparent microspheres. FIG. 7 shows a schematic cross section of exemplary optical device 700 comprising viscoelastic lightguide 110 and retroreflective film 740 having layer of transparent microspheres 741 and reflective material 742 disposed behind the microspheres. Upper binder layer 743 is disposed in front of the transparent microspheres. In general, the upper transparent binder layer and the reflective material may not be in direct contact as is shown in FIG. 7.

The upper and lower binder materials may be any material as long as the optical device can function as desired. The lower binder layer may or may not be reflective. The upper layer needs to have some transparency so that light can be retroreflected as desired. The upper and lower binder layers may be the same or different.

Figure 8:
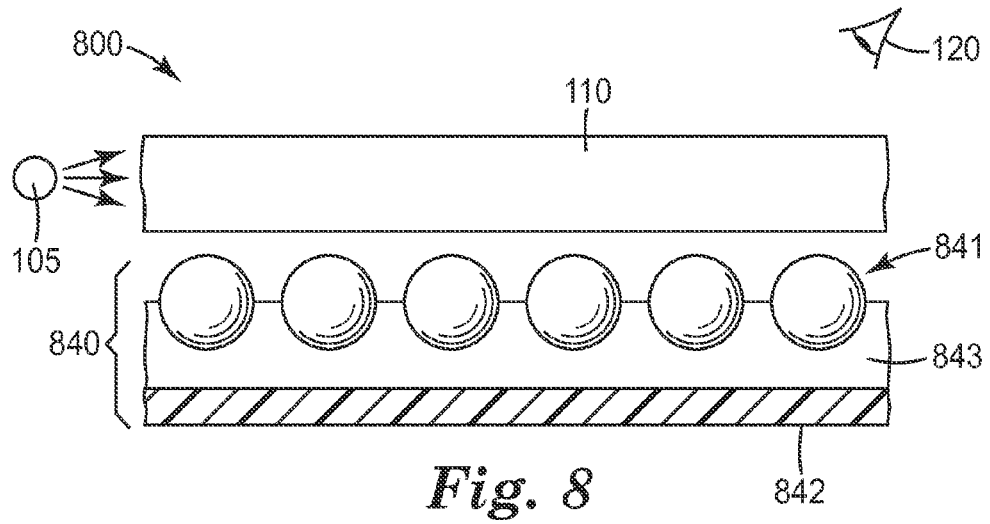
Figure 9:
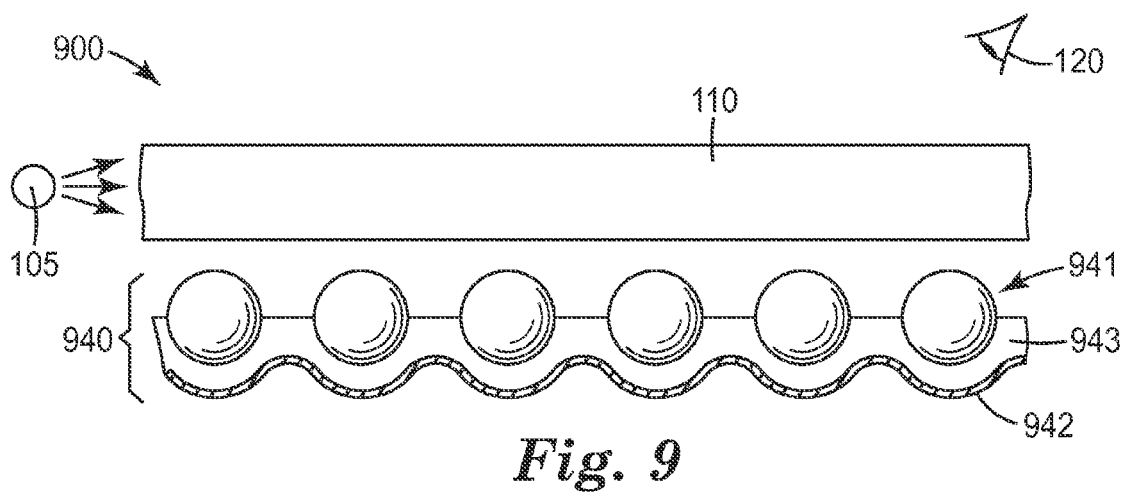

The transparent microspheres and the reflective material may or may not be in contact with each other. The retroreflective film may further comprise a transparent binder, wherein the transparent microspheres are at least partially embedded in the transparent binder, and the transparent binder is disposed between the transparent microspheres and the reflective material. FIG. 8 shows a schematic cross section of exemplary optical device 800 comprising viscoelastic lightguide 110 and retroreflective film 840 having layer of transparent microspheres 841 partially embedded in lower transparent binder layer 843. Reflective material 842 is disposed as a layer on the binder opposite the layer of microspheres. FIG. 9 shows a schematic cross section of exemplary optical device 900 comprising viscoelastic lightguide 110 and retroreflective film 940 having layer of transparent microspheres 941 partially embedded in lower binder layer 943. Reflective material 942 is disposed as a structured layer on the binder opposite the layer of microspheres.

Figure 10:
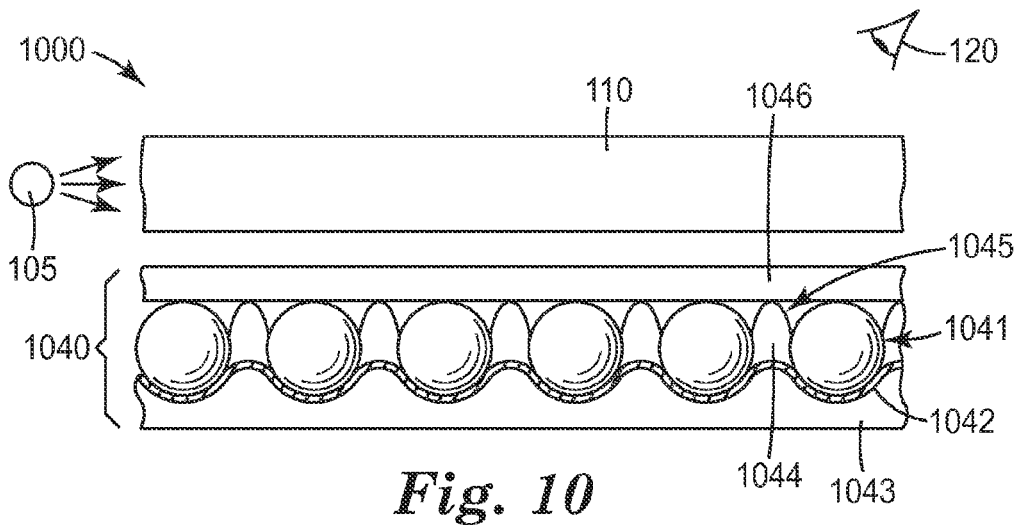

The retroreflective film may comprise transparent microspheres that are encapsulated such that a partial interface with air is maintained for at least one microsphere in the film. FIG. 10 shows a schematic cross section of exemplary optical device 1000 comprising viscoelastic lightguide 110 and retroreflective film 1040 having layer of transparent microspheres 1041 disposed on reflective layer 1042 which is disposed on lower binder layer 1043. The transparent microspheres are surrounded by network of walls 1044 extending from the reflective material to cover film 1046 such that at least some of the microspheres are surrounded by the walls. The network of walls may or may not be transparent. The walls support cover film 1046 in spaced relation to the microspheres such that a microsphere/air interface is at least partially maintained for at least one microsphere in the layer.

Figure 11:
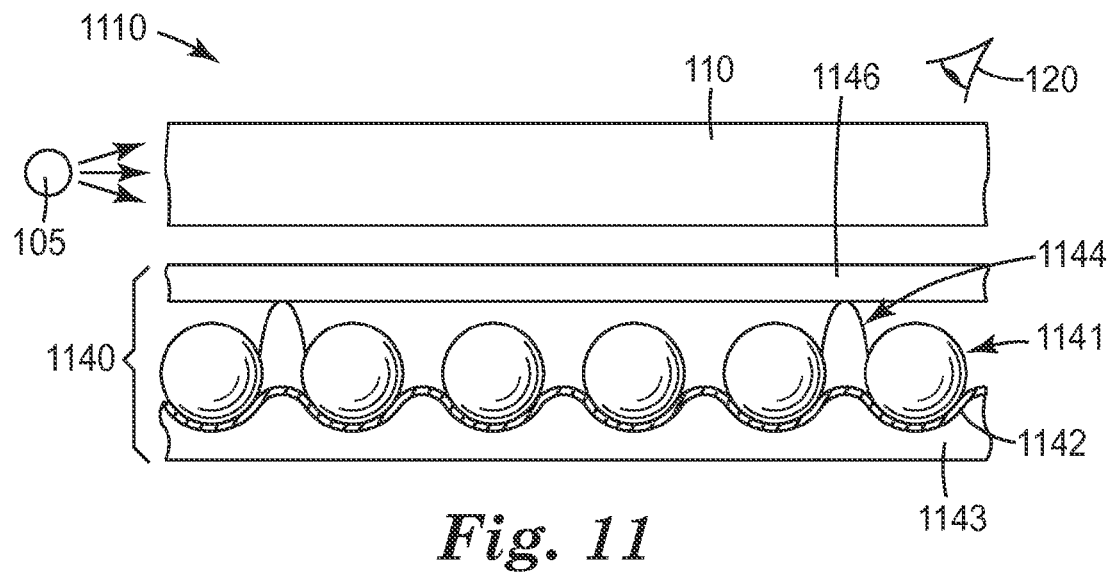

Variations of the embodiment shown in FIG. 10 are described in U.S. Pat. No. 4,678,695 (Tung et al.). For example, the transparent microspheres and the cover film may be in contact as shown in FIG. 10, or they may not be in contact as shown in FIG. 11. FIG. 11 shows a schematic cross section of exemplary optical device 1100 comprising viscoelastic lightguide 110 disposed on retroreflective film 1140. The retroreflective film comprises layer of transparent microspheres 1141 disposed on reflective layer 1142 which is disposed on lower binder layer 1143. Groups of the transparent microspheres are surrounded by network of walls 1144 extending from the reflective material to cover film 1146. The walls support cover film 1146 in spaced relation to the microspheres such that a microsphere/air interface is at least partially maintained for at least one microsphere in the layer.

Figure 12:
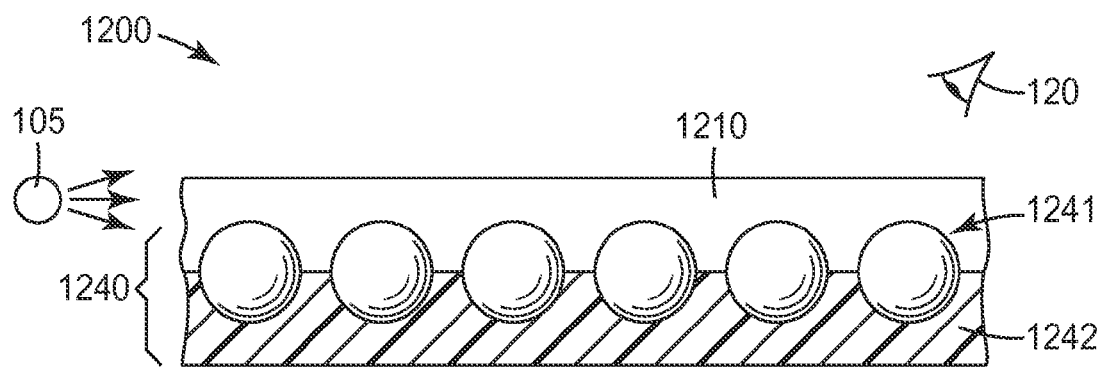
Figure 13:
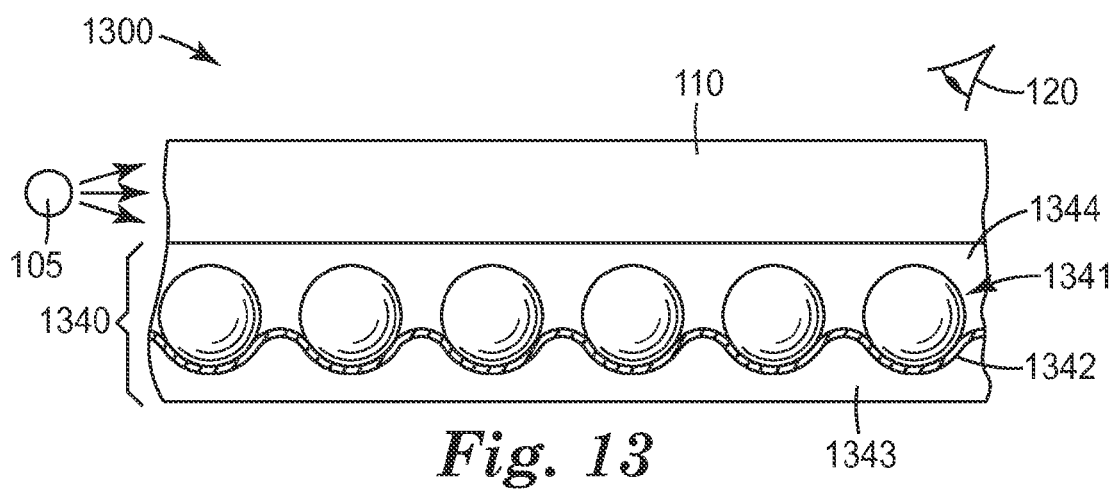
Figure 14:
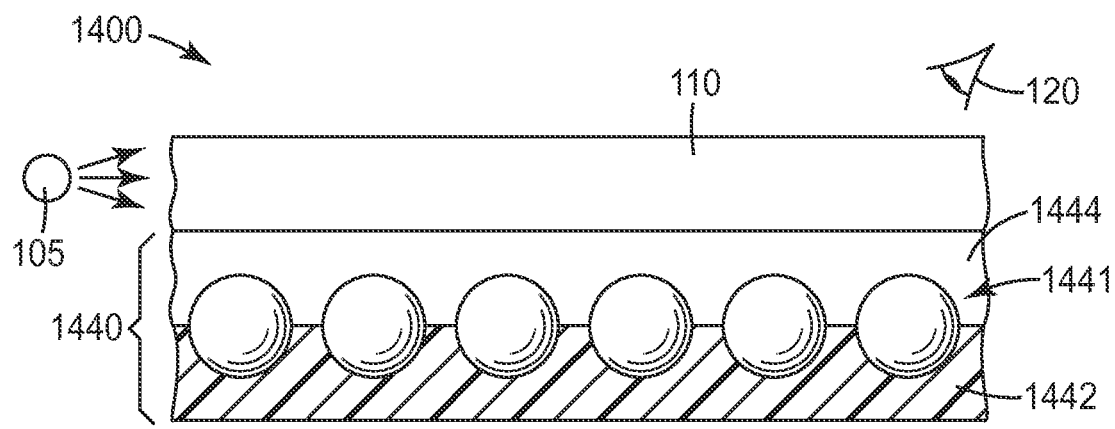

The viscoelastic lightguide may be in direct contact with the retroreflective film. FIG. 12 shows a schematic cross section of exemplary optical device 1200 comprising viscoelastic lightguide 1210 and retroreflective film 1240 having layer of transparent microspheres 1241 partially embedded in reflective binder layer 1242. The viscoelastic lightguide and the reflective binder are in direct contact such that the transparent microspheres are encapsulated. FIG. 13 shows a schematic cross section of exemplary optical device 1300 comprising viscoelastic lightguide 110 and retroreflective film 1340 having layer of transparent microspheres 1341 disposed on reflective layer 1342 which is disposed on lower binder layer 1343. Upper binder layer 1344 is disposed on the microspheres and the reflective layer such that the microspheres are encapsulated. Viscoelastic lightguide 110 is disposed on upper binder layer 1344 such that the lightguide and the retroreflective film are in direct contact. FIG. 14 shows yet another variation in which the viscoelastic lightguide and the retroreflective film are in direct contact. FIG. 14 shows a schematic cross section of exemplary optical device 1400 comprising viscoelastic lightguide 110 and retroreflective film 1440 having layer of transparent microspheres 1441 at least partially embedded in reflective layer 1442. Upper binder layer 1444 is disposed on the microspheres and the reflective layer such that the microspheres are encapsulated. Viscoelastic lightguide 110 is disposed on upper binder layer 1444 such that the lightguide and the retroreflective film are in direct contact.

In general, the retroreflective film is dimensionally stable, durable, weatherable and flexible so that it can be formed into a desired three dimensional shape.

The thickness of the retroreflective film is not particularly limited as long as it can function as desired. Exemplary thicknesses for the retroreflective film range from about 0.4 mil to about 1000 mil, from about 1 mil to about 300 mil, from about 1 mil to about 60 mil, or from about 0.5 mil to about 30 mil.

The retroreflective film may have a refractive index of from about 1.45 to about 1.65. Materials include plastics such as PLEXIGLAS from Rohm and Haas Co., and polymers of alkylene oxides, vinyl ethers, (meth)acrylates such as polymethylmethacrylate and ethylene/acrylic acids, celluloses, cellulose acetates such as cellulose acetate butyrate and ethylene/vinyl acetates, as well as polyolefins, polyesters, polyurethanes, polycarbonates, epoxies, polyvinylalcohols, natural and synthetic rubbers, polyacetals, polyacrylonitriles, polycaprolactams, aromatic polysiloxanes, polystyrenes, polyvinylchlorides and nylons. The retroreflective film may comprise colorants such as particles, dyes or pigments, UV stabilizers and the like.

Given a particular combination of viscoelastic lightguide and retroreflective film, the amount of light retroreflected may be greater than about 10%, greater than about 20%, greater than about 30%, greater than about 40%, greater than about 50%, greater than about 60%, greater than about 70%, greater than about 80%, or greater than about 90% relative to the total amount of light that enters the lightguide. Given a particular combination of viscoelastic lightguide and retroreflective film, the amount of light retroreflected may be from about 10 to about 50%, from about 20 to about 50%, from about 30 to about 50%, from about 50 to about 70%, from about 50 to about 80%, or from about 10 to about 90% relative to the total amount of light that enters the lightguide.

Figure 15:
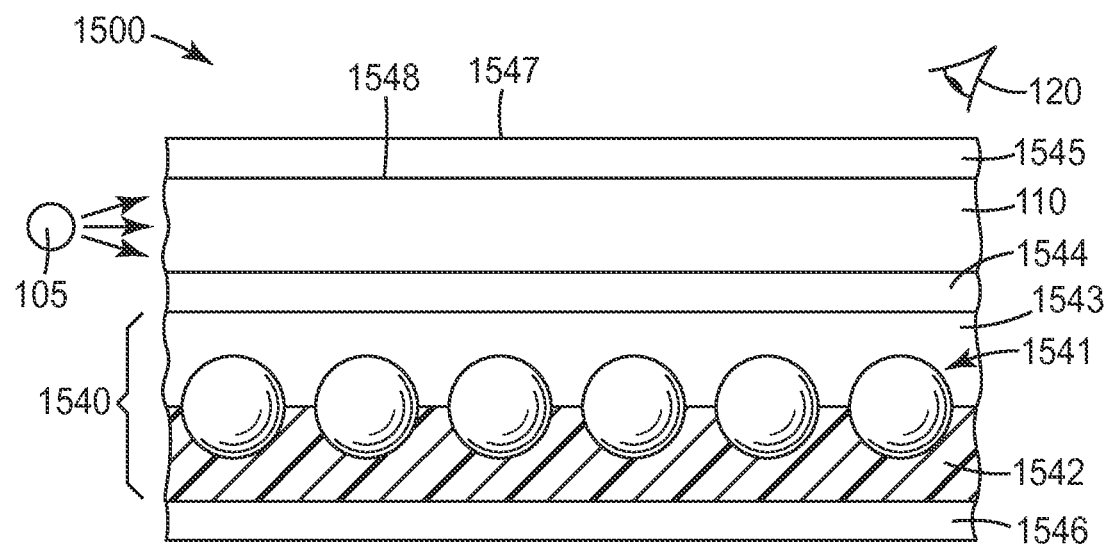

The optical articles of the optical devices described herein can be used in a variety of multilayer constructions depending on the particular application. FIG. 15 shows a schematic cross section of exemplary optical device 1500 comprising viscoelastic lightguide 110 and retroreflective film 1540 having layer of transparent microspheres 1541 at least partially embedded in a reflective binder 1542. Upper binder layer 1543 is used to encapsulate the microspheres. First additional layer 1544 is disposed between the viscoelastic lightguide and upper binder layer 1543. The first additional layer, being disposed in front of the transparent microspheres, is transparent such that the optical device can function as desired. Second additional layer 1545 is disposed on viscoelastic lightguide 110 opposite first additional layer 1544. The second additional layer, being disposed in front of the transparent microspheres, is transparent such that the optical device can function as desired. Third additional layer 1546 is disposed on lower binder layer 1542 opposite layer of transparent microspheres 1541. Any one or combination of the first, second and third additional layers may be used.

The first optional layer may be designed to interfere or not interfere with the behavior of light being extracted from the viscoelastic lightguide and/or retroreflected by the retroreflective film. The first optional layer may have opposing major surfaces that are substantially unstructured, structured with a plurality of features, or a combination thereof.

The thickness of the first optional layer is not limited as long as the optical device can function as desired. Exemplary thicknesses for the first optional layer range from about 0.4 mil to about 1000 mil.

The first optional layer may have a variety of light transmittance and haze properties. In some embodiments, the first optional layer comprises an optically clear substrate having high light transmittance of from about 80 to about 100%, from about 90 to about 100%, from about 95 to about 100%, or from about 98 to about 100% over at least a portion of the visible light spectrum. In some embodiments, the first optional layer has low light transmittance, for example, from about 0.1 to about 70%, from about 0.1 to about 50%, or from about 0.1 to about 20%. In some embodiments, the first optional layer has a haze value of from about 0.01 to less than about 5%, from about 0.01 to less than about 3%, or from about 0.01 to less than about 1%. In some embodiments, the first optional layer is hazy and diffuses light, particularly visible light. A hazy first optional layer may have a haze value of from about 5 to about 90%, from about 5 to about 50%, or from about 20 to about 50%. In some embodiments, the first optional layer is translucent in that it reflects and transmits light.

In some embodiments, the first optional layer comprises a polymeric film. Useful polymeric films include cellulose acetate, poly(meth)acrylate (acrylate and/or methacrylate), polyether sulfone, polyurethane, polyester, polycarbonate, polymethyl methacrylate, polyvinyl chloride, syndiotactic polystyrene, cyclic olefin copolymer, polyethylene terephthalate, polyethylene naphthalate, copolymer or blend based on naphthalene dicarboxylic acids, or some combination thereof. In some embodiments, the first optional layer comprises a poly(meth)acrylate having a refractive index greater than that of the viscoelastic lightguide.

The first optional layer may comprise glass which generally comprises a hard, brittle, amorphous solid, including, soda-lime glass, borosilicate glass, acrylic glass, sugar glass, and the like.

The first optional layer may provide an image as described below.

The second optional layer may be designed to interfere or not interfere with the behavior of light being extracted from the viscoelastic lightguide and/or retroreflected by the retroreflective film. The second optional layer may have opposing major surfaces 1547 and 1548 that are substantially unstructured, structured with a plurality of features, or a combination thereof. A surface of the second optional layer may comprise any one of the plurality of features described above for the viscoelastic lightguide. For example, major surface 1547 may have features comprising lenses which are particularly useful for directing light to a preferred angular distribution.

The thickness of the second optional layer is not limited as long as the optical device can function as desired. Exemplary thicknesses for the second optional layer range from about 0.4 mil to about 1000 mil.

The second optional layer may have a variety of light transmittance and haze properties. In some embodiments, the second optional layer comprises an optically clear substrate having high light transmittance of from about 80 to about 100%, from about 90 to about 100%, from about 95 to about 100%, or from about 98 to about 100% over at least a portion of the visible light spectrum. In some embodiments, the second optional layer has low light transmittance, for example, from about 0.1 to about 70%, from about 0.1 to about 50%, or from about 0.1 to about 20%. In some embodiments, the second optional layer has a haze value of from about 0.01 to less than about 5%, from about 0.01 to less than about 3%, or from about 0.01 to less than about 1%. In some embodiments, the second optional layer is hazy and diffuses light, particularly visible light. A hazy second optional layer may have a haze value of from about 5 to about 90%, from about 5 to about 50%, or from about 20 to about 50%. In some embodiments, the second optional layer is translucent in that it reflects and transmits light.

In some embodiments, the second optional layer comprises a polymeric film. Useful polymeric films include cellulose acetate, poly(meth)acrylate (acrylate and/or methacrylate), polyether sulfone, polyurethane, polyester, polycarbonate, polymethyl methacrylate, polyvinyl chloride, syndiotactic polystyrene, cyclic olefin copolymer, polyethylene terephthalate, polyethylene naphthalate, copolymer or blend based on naphthalene dicarboxylic acids, or some combination thereof. In some embodiments, the second optional layer comprises a poly(meth)acrylate having a refractive index greater than that of the viscoelastic lightguide.

The second optional layer may comprise glass which generally comprises a hard, brittle, amorphous solid, including, soda-lime glass, borosilicate glass, acrylic glass, sugar glass, and the like.

The second optional layer may comprise a release liner. Release liners typically have a low adhesion surface for contact with an adhesive layer. Release liners may comprise paper such as Kraft paper, or polymeric films such as poly (vinyl chloride), polyester, polyolefin, cellulose acetate, ethylene vinyl acetate, polyurethane, and the like. The release liner may be coated with a layer of a release agent such as a silicone-containing material or a fluorocarbon-containing material. The release liner may comprise paper or a polymeric film coated with polyethylene which is coated with a silicone-containing material. Exemplary release liners include liners commercially available from CP Films Inc. under the trade designations "T-30" and "T-10" that have a silicone release coating on polyethylene terephthalate film.

Exemplary release liners include structured release liners. Exemplary release liners include any of those referred to as microstructured release liners. Microstructured release liners are used to impart a microstructure on the surface of an adhesive layer. The microstructured surface can aid air egress between the adhesive layer and the adjacent layer. In general, it is desirable that the microstructure disappear over time to prevent interference with optical properties. Microstructures are generally three-dimensional structures that are microscopic in at least two dimensions (i.e., the topical and/or cross-sectional view is microscopic). The term "microscopic" as used herein refers to dimensions that are difficult to resolve by the human eye without aid of a microscope.

The microstructures may assume a variety of shapes. Representative examples include hemispheres, prisms (such as square prisms, rectangular prisms, cylindrical prisms and other similar polygonal features), pyramids, ellipses, grooves (e.g., V-grooves), channels, and the like. In some cases, it may be desirable to include topographical features that promote air egress at the bonding interface when the article is laminated to a substrate. In this regard, V-grooves and channels that can extend to the edge of the article are particularly useful. The particular dimensions and patterns characterizing the microstructures are selected based upon the specific application for which the article is intended. Another example of useful microstructures are described in US 2007/0292650 A1 (Suzuki) wherein the microstructured adhesive layer surface has one or more grooves that exist only in an inner area of the surface and are not open at side surfaces of the layer. These grooves may be in the form of a straight line, branched straight lines, cross, circle, oval, or polygon as viewed from above, and where each form may be composed of plural discontinuous grooves. These grooves may have a width of from 5 to 100 micrometers and a depth of from 5 to 50 micrometers.

In some embodiments, the first and/or second optional layers may be used to provide an image. The viscoelastic layer may also provide an image. A variety of different constructions of the viscoelastic lightguide and the first and second optional layers may be made to provide an image. The first optional layer may comprise an image printed on either side of the layer, or the image may be embedded in the layer. The second optional layer may comprise an image printed on either side of the layer, or the image may be embedded in the layer. The image may comprise one or more materials different from that of the optional layer; the one or more materials may be in regions of the layer wherein the regions are arranged to provide the image. The regions are designed to reflect light or transmit light within a particular range of wavelengths depending on the particular imaging materials.

Imaging materials may be deposited by printing or marking, e.g., by inkjet printing, laser printing, electrostatic printing and the like. Images may be monochrome such as black and white images, or they may be colored images. Images may comprise one or more colors throughout, e.g., a uniform layer of color. Images that provide a general or custom surface may be used. For example, an image may be designed such that the optical article appears as plastic, metal or wood grain; fabric, leather, non-woven, etc. The image may also comprise white dots which may be disposed on a surface or interface. The white dots may be arranged as described for extraction features of conventional solid lightguides, e.g., as described in US 2008/232135 A1 (Kinder et al.). Useful imaging materials include those that reflect all or some light within a particular range of wavelengths. Useful imaging materials include those that transmit all or some light within a particular range of wavelengths. Exemplary imaging materials include colorants such as pigments and dyes. Imaging materials may also comprise photonic crystals.

The third optional layer may be a reflector that reflects light being retroreflected by the retroreflective film. In some embodiments, the reflector comprises a specular reflector wherein the reflection angle of light is within about 16° of the incident angle. A specular reflector may be fully or near fully specular as a reflector over some range of incident angles. Also, specular reflectors may be from about 85 to about 100% reflective, from about 90 to about 100%, or from about 95 to about 100%, across a particular region of the electromagnetic spectrum, for example, the visible region. Suitable specular reflectors include mirrors such as a plane mirrors comprising a film of reflecting material, typically a metal, coated on glass.

In some embodiments, the reflector comprises a diffuse reflector wherein light incident upon the reflector is reflected and scattered at a surface of the diffuse reflector. For a diffuse reflector, light of a given incident angle reflects with multiple reflection angles wherein at least some of the reflection angles are greater than about 16° of the incident angle. A diffuse reflector may be fully or near fully reflective over some range of incident angles. Also, diffuse reflectors may be from about 85 to about 100% reflective, from about 90 to about 100%, or from about 95 to about 100%, across a particular region of the electromagnetic spectrum, for example, the visible region. The diffuse reflector may comprise a layer of organic, inorganic or hybrid organic/inorganic particles disposed on a substrate. The particles may be dispersed in a polymeric material or binder. For example, the diffuse reflector may comprise a layer of barium sulfate particles loaded in a polyethylene terephalate film.

In some embodiments, the viscoelastic lightguide may comprise a PSA matrix and particles as describe in U.S. Pat. No. 6,288,172 (Goetz et al.) comprising a mixture of a PSA matrix having a refractive index of $n_1$ filled with organic, polymeric microparticles having a refractive index $n_2$ wherein $n_1$ is greater than $n_2$. For example, PSA matrix is a film forming or a PSA of microsphere-based composition and the organic polymeric microparticles are prepared from fluorinated acrylate monomers or fluorinated methacrylate monomers having refractive less than that of the PSA.

The third optional layer may comprise a multilayer optical film having from about 10 to about 10,000 alternating layers of first and second polymer layers wherein the polymer layers comprise polyesters. The multilayer optical film may comprise a three-quarter mirror. The multilayer optical film may comprise a mirror. The multilayer optical film may comprise a reflective film, a polarizer film, a reflective polarizer film, a diffuse blend reflective polarizer film, a diffuser film, a brightness enhancing film or a turning film. Exemplary multilayer optical films are described in U.S. Pat. No. 5,825,543; 5,828, 488 (Ouderkirk et al.); U.S. Pat. Nos. 5,867,316; 5,882,774; 6,179,948 B1 (Merrill et al.); U.S. Pat. Nos. 6,352,761 B1; 6,368,699 B1; 6,927,900 B2; 6,827,886 (Neavin et al.); U.S. Pat. No. 6,972,813 B1 (Toyooka); U.S. Pat. No. 6,991,695; 2006/0084780 A1 (Hebrink et al.); 2006/0216524 A1; 2006/0226561 A1 (Merrill et al.); 2007/0047080 A1 (Stover et al.); WO 95/17303; WO 95/17691; WO 95/17692; WO 95/17699; WO 96/19347; WO 97/01440; WO 99/36248; and WO 99/36262. Exemplary specular reflectors include those available from 3M™ Company, for example, 3M™ High Intensity Grade Reflective Products such as High Reflective Visible Mirror Film and High Transmission Mirror Film, and Vikuiti™ films such as Vikuiti™ Enhanced Specular Reflector.

The third optional layer may comprise aluminum.

The third optional layer may comprise a nanofoam which typically comprises a nanostructured, porous material containing pores with diameters of less than about 100 nm. For example, the third optional layer may comprise an aerogel which is a low-density solid state material derived from gel in which the liquid component of the gel has been replaced with air. Silica, alumina and carbon aerogels are exemplary aerogels that may be used. The third optional layer may comprise a low refractive index material such as a polymer film filled with white particles.

The third optional layer may comprise an adhesive layer for attaching the optical device to some substrate.

The viscoelastic lightguide is adapted to receive at least some light emitted by the light source. In some embodiments, a specially designed input surface may not be needed because the light source can be pressed into the viscoelastic lightguide such that optical coupling occurs. In some embodiments, the light source may stick to the viscoelastic lightguide, for example, if the lightguide comprises a PSA. In some embodiments, the light source may be embedded in the viscoelastic lightguide.

In some embodiments, the viscoelastic lightguide comprises an input surface adapted to receive light from the light source. The input surface may have a variety of topographies depending on the optical coupling means and/or the particular light source. The input surface may have an appropriate curvature. The input edge comprising the input surface may have a particular cavity, for example a concave hemispherical cavity, to receive a convex lens of a light source. Alternately, the input surface may have refractive structures such as prisms or lenses to optically couple light from the light source into the viscoelastic lightguide.

In some embodiments, an extractor article disposed between the light source and the input edge may be used to facilitate optical coupling with at least some of the light emitted by the light source. Useful extractor articles may have an appropriate curvature for extracting light from the light source. A coupling material for matching refractive indices of the viscoelastic lightguide and some element of the light source may be used. A crosslinkable material may be used for attaching the viscoelastic lightguide to some part of the light source, and subsequently cured using heat and/or light to form the crosslinked material.

The coupling material may comprise silicone gel. The silicone gel may be crosslinked. The silicone gel may be mixed with a silicone oil. The silicone gel may comprise one or more silicone materials such as, for example, dimethylsilicone, diphenylsilicone, or phenylmethylsilicone. The silicone gel may comprise phenylmethylsilicone moieties that are cross-linked. The silicone gel may comprise phenylmethylsilicone moieties which are cross-linked and phenylmethylsilicone oil. The silicone gel may comprise phenylmethylsilicone moieties which are cross-linked and phenylmethylsilicone oil in a weight ratio from 0.2:1 to 5:1. The silicone gel may comprise crosslinked phenylmethylsilicone. Exemplary use of silicone gels is described in U.S. Pat. No. 7,315,418 (DiZio et al.) incorporated herein by reference.

The light source may be optically coupled to the viscoelastic lightguide such that at least some of the light from the light source can enter the lightguide. For example, a light source may be optically coupled to the viscoelastic lightguide such that from about 1 to about 10%, from about 1 to about 20%, from about 1 to about 30%, from about 1 to about 40%, from about 1 to about 50%, from about 1 to about 100%, from about 1 to about 100%, from about 50 to about 100%, or from about 1 to about 100% of light emitted by the light source enters the viscoelastic lightguide. The light source may emit light having a random or a particular angular distribution.

The light source may comprise any suitable light source. Exemplary light sources include linear light sources such as cold cathode fluorescent lamps and point light sources such as light emitting diode (LEDs). Exemplary light sources also include organic light-emitting devices (OLEDs), incandescent bulbs, fluorescent bulbs, halogen lamps, UV bulbs, infrared sources, near-infrared sources, lasers, or chemical light sources. In general, the light emitted by the light source may be visible or invisible. At least one light source may be used. For example, from 1 to about 10,000 light sources may be used. The light source may comprise a row of LEDs positioned at or near an edge of the viscoelastic lightguide. The light source may comprise LEDs arranged on a circuit such that light emitted from the LEDs lights up continuously or uniformly the viscoelastic lightguide throughout a desired area. The light source may comprise LEDs that emit light of different colors such that the colors can mix within the viscoelastic lightguide. In this way, a graphic could be designed to appear differently at different times during its use.

The light source may be powered by any suitable means. The light source may be powered using a battery, a DC power supply, an AC to DC power supply, an AC power supply, or a solar photovoltaic cell.

The viscoelastic lightguide may be made using any method or process commonly used for making viscoelastic articles. Typical processes comprise those that are continuous processes such as continuous cast and cure, extrusion, microreplication, and embossing methods. Various types of radiation may be used for processes in which a material needs to be cured, e.g., crosslinked. Conventional molding processes may also be used. Molds may be made by micro-machining and polishing of a mold material to create the desired features, structured surfaces, etc. Laser ablation may be used to structure a surface of the viscoelastic lightguide and molds. Further detailed description of these processes is described in the Sherman et al. references cited above.

Optical articles comprising the viscoelastic lightguide and retroreflective film may be made in a number of ways. In some embodiments, the lightguide and retroreflective film may be made separately, contacted and pressed together using finger pressure, a hand roller, an embosser or a laminator. In some embodiments, the retroreflective film may be formed on the viscoelastic lightguide by coating a retroreflective film material on the lightguide. The retroreflective film material may then be treated to form the retroreflective film. For example, the retroreflective film material may be extruded onto the viscoelastic lightguide in the form of a layer and cooled to solidify the material to form the retroreflective film. Alternatively, the retroreflective film material may be curable and treated by heating and/or applying radiation to form the retroreflective film. The retroreflective film material may include solvent and the retroreflective film is formed by removing the solvent.

In some embodiments, the viscoelastic lightguide may be formed on the retroreflective film by coating a viscoelastic material on the retroreflective film. The viscoelastic material may then be treated to form the viscoelastic lightguide. For example, the viscoelastic material may be extruded onto the retroreflective film in the form of a layer and cooled to solidify the material to form the lightguide. Alternatively, the viscoelastic material may be curable and treated by heating and/or applying radiation to form the lightguide. The viscoelastic material may include solvent and the lightguide is formed by removing the solvent.

In cases where the retroreflective film material or the viscoelastic material is curable, an optical article having a partially cured retroreflective film or lightguide, respectively, may be made. In cases where the retroreflective film material or the viscoelastic material is curable, chemically curing materials may be used such that the material is crosslinked. In cases where the retroreflective film material or the viscoelastic material is curable, the retroreflective film material may be cured before, after and/or during contact with another material or the light source.

In cases where the retroreflective film material or the viscoelastic material is curable using light, the light source may be optically coupled to the material and curing carried out by injecting light from the light source.

A retroreflective film may be used to structure a surface of the viscoelastic lightguide, e.g., the viscoelastic lightguide may not be structured by itself, rather, it becomes structured when contacted with a structured surface of a retroreflective film. It is also possible for the viscoelastic lightguide to have a structured surface such that it deforms a surface of a retroreflective film to create the interface.

The optical articles and optical devices disclosed herein may be provided in any number of ways. The optical articles and optical devices may be provided as sheets or strips laid flat, or they can be rolled up to form a roll. The optical articles and optical devices may be packaged as single items, or in multiples, in sets, etc. The optical articles and light sources may be provided in an assembled form, i.e., as an optical device. The optical articles and light sources may be provided as kits wherein the two are separate from each other and assembled at some point by the user. The optical articles and light sources may also be provided separately such that they can be mixed and matched according to the needs of the user. The optical articles and optical devices may be temporarily or permanently assembled to light up.

The optical articles disclosed herein may be altered depending on a particular use. For example, the optical articles can be cut or divided by any suitable means, e.g., using a scissors or a die cutting method. A particularly useful die cutting method is described in U.S. Provisional Ser. No. 61/046,813 (64033US002, Sherman et al.) incorporated herein by reference. The optical articles and devices may be cut or divided into different shapes such as alphabetic letters; numbers; geometric shapes such as squares, rectangles, triangles, stars and the like.

Figure 19:
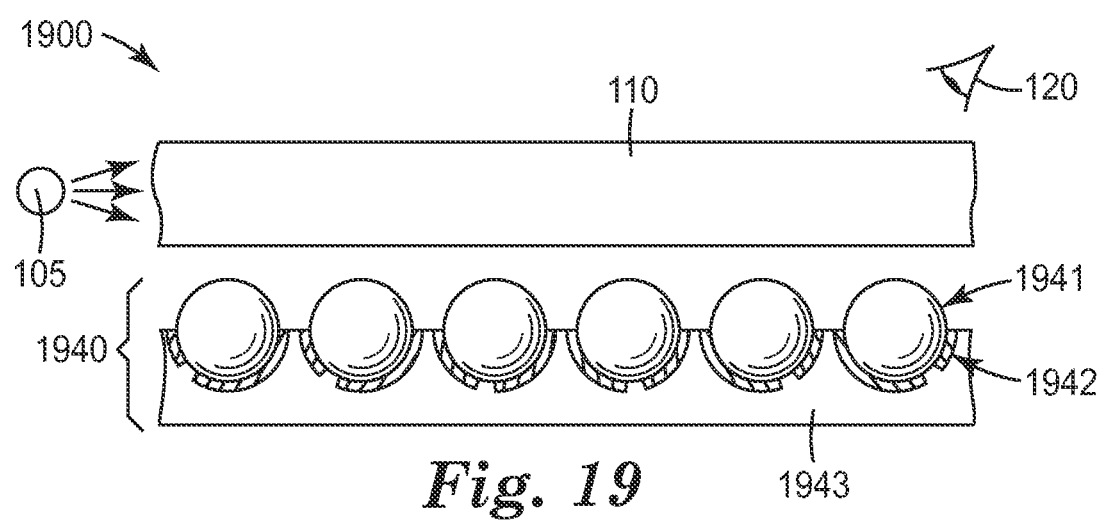
FIG. 19 shows a schematic cross section of an exemplary device having a front lit configuration and that provides a floating image.

The optical articles and optical devices may be used for signage such as for graphic arts applications. The optical articles and optical devices may be used on or in windows, walls, wallpaper, wall hangings, pictures, posters, billboards, pillars, doors, floormats, vehicles, or anywhere signage is used. Exemplary optical articles a may be used on curved surfaces as shown in FIG. 19 of 61/169,973 filed on Apr. 16, 2009 (64347US008, Sherman et al.).

Figure 16:
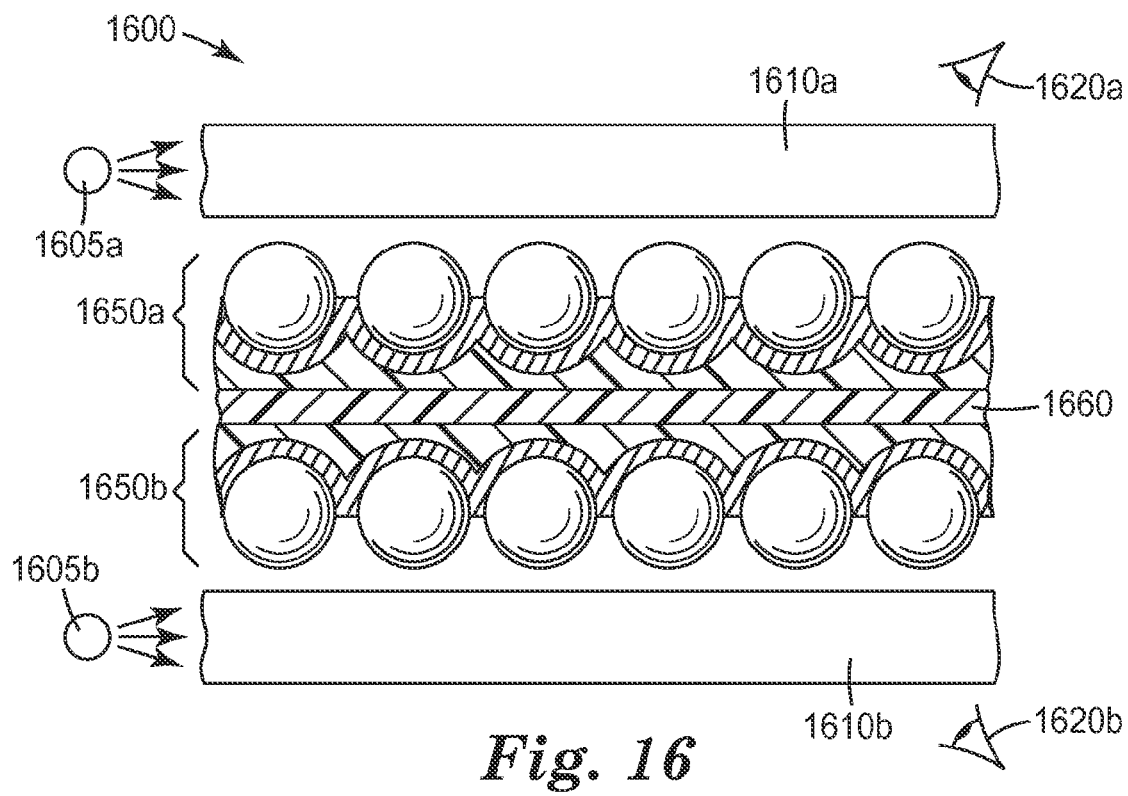

The optical articles and optical devices may be double-sided such that light can be observed on both sides of a sign, marking, etc. FIG. 16 shows a schematic cross section of exemplary optical device 1600 comprising first viscoelastic lightguide 1610*a*, second viscoelastic lightguide 1610*b*, first retroreflective film 1650*a* and second retroreflective film 1650*b*. The first and second pairs of viscoelastic lightguide and retroreflective film are disposed on opposite sides of third optional substrate 1660. In this embodiment, light is observable on both sides of the device as shown by eyes 1620*a-b*.

Figure 17:
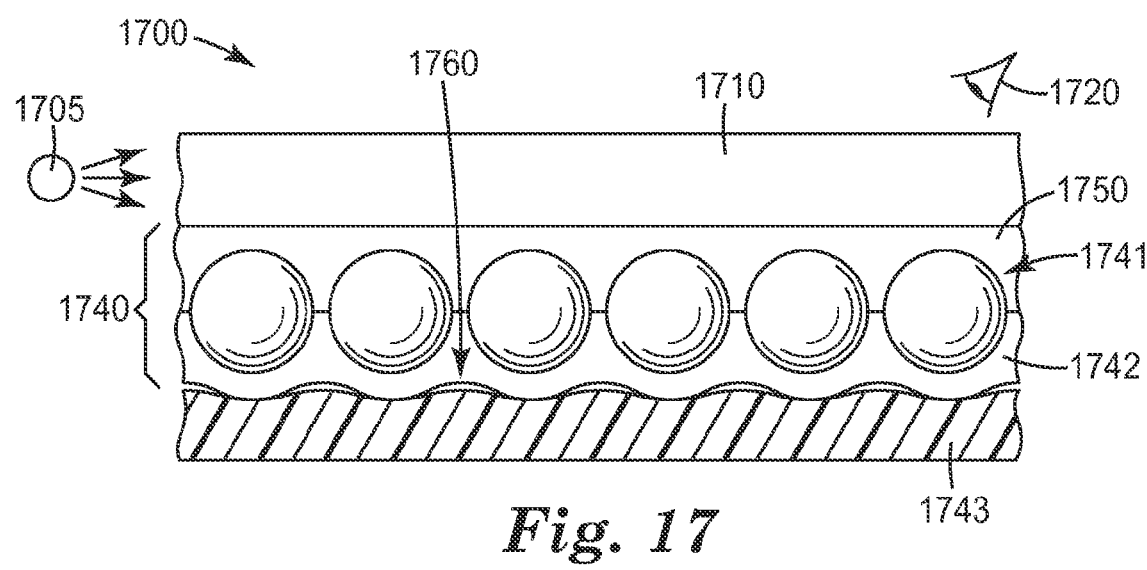

The optical articles and optical devices may provide images by including an imaged layer disposed between any two layers described above. FIG. 17 shows a schematic cross section of exemplary optical device 1700 comprising viscoelastic lightguide 1710 disposed on retroreflective film 1740. Retroreflective film 1740 comprises layer of transparent microspheres 1741 at least partially embedded in lower binder layer 1742 with upper binder layer 1750 encapsulating the microspheres. Third optional layer 1743 is disposed on the retroreflective film opposite the viscoelastic lightguide. Imaging layer 1760 is disposed between the lower binder layer and the third optional layer. The imaging layer is shown as being discontinuous, but it may also be a continuous layer such as a film or sheet disposed between the two other layers. The imaging layer may be made by printing as described above.

Figure 20:
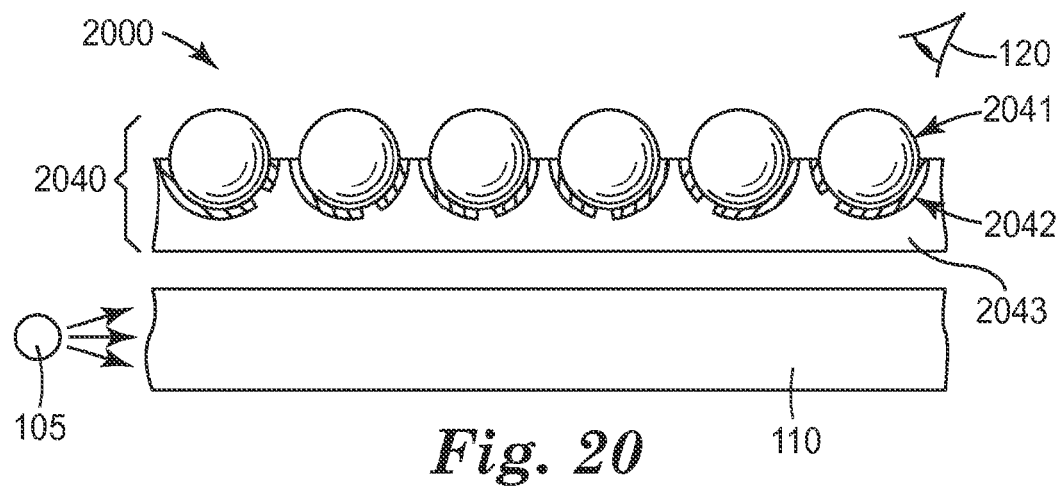
FIG. 20 shows a schematic cross section of an exemplary device having a back lit configuration and that provides a floating image.

The optical articles and devices may be used for safety purposes wherever light is desired. For example, the optical articles and devices may be used to illuminate one or more steps of a ladder, steps of a stairway, aisles such as in airplanes and movie theatres, walkways, egress, handrails, work zone identification signs and markings. An exemplary optical article for one of these applications is shown in FIG. 20 of 61/169,973 filed on Apr. 16, 2009 (64347US008, Sherman et al.).

Figure 21:
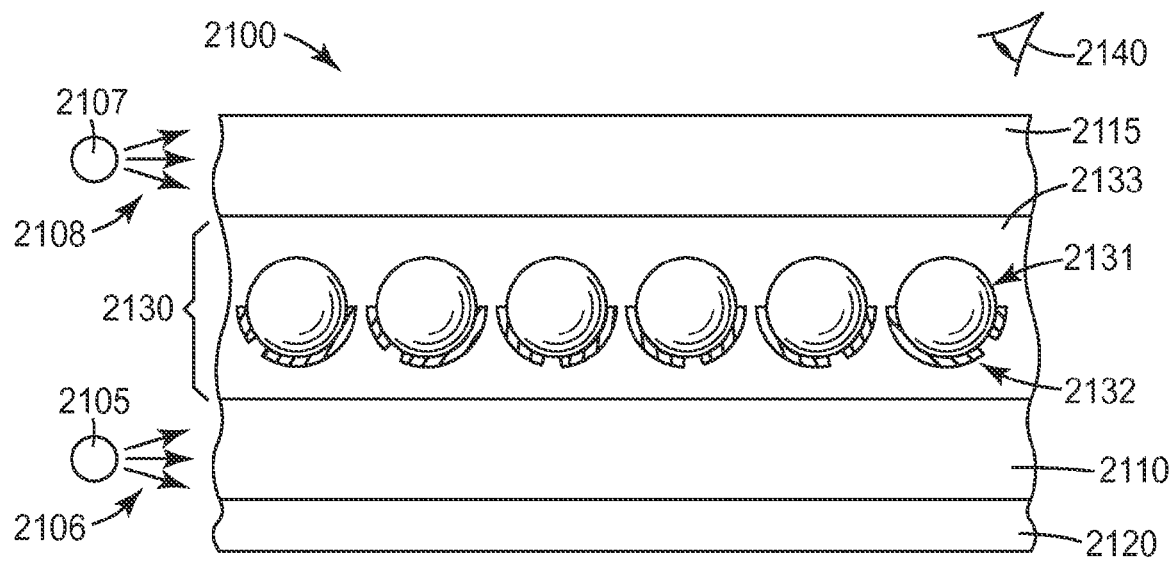
FIG. 21 shows a schematic cross section of an exemplary device having front and back configurations and that provides a floating image.

The optical articles and optical devices may be used in a variety of items such as reading lights; party and holiday decorations such as hats, ornaments, string lighting, balloons, gift bags, greeting cards, wrapping paper; desk and computer accessories such as desk mats, mousepads, notepad holders, writing instruments; sporting items such as fishing lures; craft items such as knitting needles; personal items such as toothbrushes; household and office items such as clock faces, wall plates for light switches, hooks, tools. An exemplary optical article for one of these applications is shown in FIG. 21 of 61/169,973 filed on Apr. 16, 2009 (64347US008, Sherman et al.).

The optical articles and optical devices may be used on clothing and clothing accessories for decorative and/or safety purposes. For example, the optical articles and optical devices may be used on outerwear for cyclists, or on clothing or headgear for miners. For another example, the optical articles and optical devices may be used on or in straps and wristbands of watches, or on or in watch faces. An exemplary optical article for one of these applications is shown in FIG. 22 of 61/169,973 filed on Apr. 16, 2009 (64347US008, Sherman et al.).

The optical articles and optical devices may be used anywhere light is needed or desired. The optical articles and optical devices may be disposed on a top surface of a shelf such that light from the article or device, respectively, is emitted in an upward direction. Likewise, the optical articles and optical devices may be disposed on a bottom surface of a shelf such that light from the article or device, respectively, is emitted in a downward direction. The optical articles and optical devices may also be disposed on or within a shelf having a light transmissive portion. The articles and devices may be arranged such that light is emitted from the light transmissive portion. An exemplary optical article for one of these applications is shown in FIG. 23 of 61/169,973 filed on Apr. 16, 2009 (64347US008, Sherman et al.).

The optical articles and devices may be used as flashlights. For example, optical articles and optical devices may be disposed on the outside or inside of a battery cover plate or other part of an electronic handheld device. The optical articles and optical devices may or may not be hardwired to the electronic device's battery but could have its own power source. The electronic device's battery cover may or may not be removable from the rest of the device comprising the display.

The optical articles and optical devices may be used for vehicles such as automobiles, marine vehicles, buses, trucks, railcars, trailers, aircraft, and aerospace vehicles. The optical articles and devices may be used on almost any surface of a vehicle including the exterior, interior, or any in-between surface. For example, the optical articles and devices may be used to light up door handles on the exterior and/or interior of a vehicle. The optical articles and devices may be used to illuminate trunk compartments, for example, they may be positioned on the underside of the trunk lid or inside the compartment. The optical articles and devices may be used on bumpers, spoilers, floor boards, windows, on or as tail lights, sill plate lights, puddle lights, emergency flashers, center high mounted stop lights, or side lights and markers. The optical articles and devices may be used to illuminate the inside of engine compartments, for example, they may be positioned on the underside of the hood, inside the compartment, or on an engine part.

The optical articles and devices may also be used on the edge surfaces of vehicular doors between the exterior and interior panels of the doors. These optical articles and devices may be used to provide a variety of information for the user, manufacturer, etc.

The optical articles and devices may be used to illuminate the instrument panel of a vehicle where lighted areas are typically displayed. The optical articles and devices may be used on other interior items such as cupholders, consoles, handles, seats, doors, dashboards, headrests, steering wheels, wheels, portable lights, compasses, and the like. The optical articles and devices may be used on back or pass areas for reading light or to provide ambient lighting for inside a vehicle. FIG. 24 61/169,973 filed on Apr. 16, 2009 (64347US008, Sherman et al.). shows an exemplary automobile having optical articles 2400 and 2401.

The optical articles and optical devices may be used in the manufacture of an item or as a replacement part of an item. For example, the optical articles and optical devices may be sold to an automobile manufacturer or automobile repair shop for assembly or repair of some specific part of an automobile. FIG. 25 of 61/169,973 filed on Apr. 16, 2009 (64347US008, Sherman et al.). shows an exemplary automobile having tail light 2500. An optical article or optical device (not shown) is disposed behind the outside layer of the tail light which is typically red, yellow or clear plastic. The tail light may comprise a cavity with a light bulb or LED as a light source. An optical article or device may be used in the cavity as a replacement for the light source. Alternatively, the tail light may not comprise a cavity or at least comprise a much smaller cavity than is used in today's automobiles. An optical article or optical device may be disposed behind or within the outside layer of the tail light such that the overall size of the tail light is reduced. The optical articles and optical devices may be used for traffic safety such as for traffic signs, street signs, highway dividers and barriers, toll booths, pavement markings, and work zone identification signs and markings. The optical articles and devices may be used on license plates for decoration, to provide information such as vehicle registration, etc. The optical articles and devices may also be used to provide light near license plates such that the license plates are lit up from the side, top, etc. The optical articles and optical devices may be used in the construction of a front lit illuminated license plate assembly.

The optical articles and optical devices may be used on or in display devices such as cell phones, personal digital devices, MP3 players, digital picture frames, monitors, laptop computers, projectors such as mini-projectors, global positioning displays, televisions, etc. The display device can be assembled without the need for adhesives to bond display components to the viscoelastic lightguide. The optical articles and devices may also be used for lighting buttons and keypads in various electronic devices.

Figure 18:
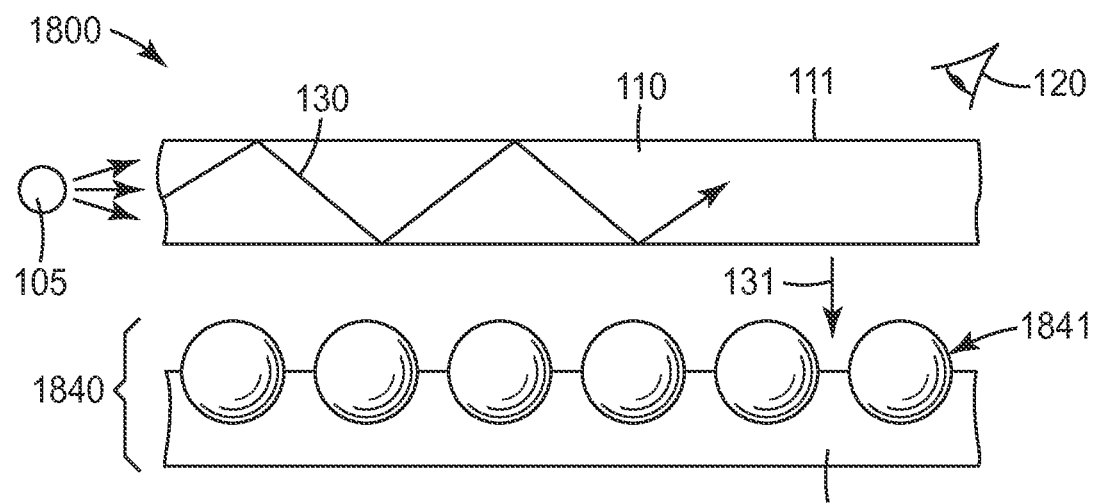

In some embodiments, particularly in optical devices having a front lit configuration or optical articles designed to be used in a front lit configuration, the retroreflective film suitable for retroreflecting light may comprise a layer of transparent microspheres without any reflective material disposed behind the microspheres. FIG. 18 shows a schematic cross section of exemplary optical device 1800 having a front lit configuration. Viscoelastic lightguide 110 is on top of retroreflective film 1840 comprising layer of transparent microspheres 1841. The transparent microspheres may be at least partially embedded in transparent binder 1843. The reflective material is not needed if the retroreflective film can retroreflect light sufficiently so that the optical device can function as desired. For example, the refractive index difference between the transparent microspheres and transparent binder may be large enough so that sufficient light is retroreflected and not refracted at the interface between the microspheres and binder.

In some embodiments, the retroreflective film suitable for retroreflecting light may provide a virtual or floating image in which an image is formed and appears to float above or below the layer of transparent microspheres, or both. FIG. 19 shows a schematic cross section of exemplary optical device 1900 having a front lit configuration. Viscoelastic lightguide 110 is on top of retroreflective film 1940 comprising layer of transparent microspheres 1941. The transparent microspheres may be at least partially embedded in binder 1943 which may or may not be transparent. Reflective material 1942 is associated with each transparent microsphere. The reflective material forms an individual image, and a composite image is formed by the individual images such that the composite image appears to the unaided eye to float in front of the optical article as indicated by eye 120.

Reflective material 1942 typically comprises a radiation sensitive material which, upon exposure to radiation, changes to provide a contrast with reflective material that was not exposed to the radiation. Exemplary radiation sensitive materials include metals such as aluminum, silver, copper and gold; metal oxides such as aluminum oxide; and non-metallic materials such as zinc sulfide and silicon dioxide. Exemplary radiation sources include any of those that emit light in a wavelength range of from about 200 nm to about 11 um. The reflective material may be imaged by directing collimated light through a lens toward the front side of the retroreflective film. The image may be formed by inducing a compositional or color change in the reflective material, or by removal of the material.

In some embodiments, an optical device having a back lit configuration may provide a floating image. FIG. 20 shows a schematic cross section of exemplary optical device 2000 in which viscoelastic lightguide 110 is below retroreflective film 140 or farther than the retroreflective film to the viewer as indicated by eye 120.

In some embodiments, retroreflective film used to provide floating images may comprise a layer of transparent microspheres without any reflective material disposed on the microspheres. The microspheres are imaged using radiation.

In some embodiments, floating images having more than one color may be made using an optical device having both a front and back lit configuration. FIG. 21 shows a schematic cross section of exemplary optical device 2100. Retroreflective film 2130 comprises layer of transparent microspheres 2131 embedded in transparent polymeric binder 2133, and reflective material 2132 is associated with each microsphere. On opposing sides of retroreflective film 2130 are disposed lower viscoelastic lightguide 2110 and upper viscoelastic lightguide 2115. Optional reflective layer 2120 is disposed on lower viscoelastic lightguide 2110 opposite the retroreflective film. Lower light source 2105 emits light represented by rays 2106 having a first color. Lower light source 2105 is positioned relative to lower viscoelastic lightguide 2110 such that light emitted by light source 2105 enters viscoelastic lightguide 2110 and is transported within the lightguide by total internal reflection. Upper light source 2107 emits light represented by rays 2108 having a second color. Upper light source 2107 is positioned relative to upper viscoelastic lightguide 2115 such that light emitted by light source 2107 enters viscoelastic lightguide 2115 and is transported within the lightguide by total internal reflection. The first and second colors may be different, or they may be the same.

Detailed description of materials and methods used to form floating images are described in U.S. Pat. No. 6,288,842 B1

(Florczak et al.); U.S. Pat. No. 7,336,422 (Dunn et al.); US 2008/0130126 A1 (Brooks et al.); US 2007/0081254 A1 (Endle et al.); US 2008/0118862 A1; and U.S. application Ser. No. 12/257,223 (Endle et al.); all of which are incorporated by reference.

EXAMPLE

An adhesive comprising 85/14/1 by weight of isooctyl acrylate/isobornyl acrylate/acrylic acid, 0.08 wt. % 1-6-hexanediol diacrylate and 0.20 wt. % IRGACURE 651 (Ciba Specialty) was coated onto a 2.5 mil thick polymeric mirror film (Vikuiti™ Enhanced Specular Reflector from 3M™ Co.), using a notched bar knife coater. The adhesive was coated with a wet thickness of 50 mils (1250 um) on one side and 26 mils (1000 um) on the other to give a slight wedge. The adhesive coating was covered with a silicone release liner (CP Films T10 2.0 mil polyester release liner) and cured using a low intensity UV lamp for 15 minutes. The adhesive had a refractive index of 1.474 as measured on an Abbe refractometer. After the curing was completed, the release liner was removed and a virtual image graphic film was then laminated to the adhesive layer surface opposite the polymeric mirror film (4 inch by 3.25 inch area). A 4 inch long side-emitting LED circuit (Honglitronic Part No. HL-4008U4R30K16N-12 flexible strip with red LEDs) was pressed into the cured PSA layer and light was easily passed through the entire 3.5 inches of PSA length and was able to be visibly seen exiting through the ends.

On top of the virtual image graphic film another adhesive wedge film cured between two release liner sheets, was laminated on top. A 4 inch long side-emitting LED circuit (Honglitronic Part No. HL-LR4008W-SESM flexible strip with white LEDs) was pressed into the adhesive layer on top of the virtual image film. The adhesive face left covered with (CP Films T10 2.0 mil polyester release liner). The LEDs were powered with a 12 volt source with less than 1 amp current. The red light was seen to pass from the bottom lightguide layer in the image shape, and the white light was seen to bounce from the top surface of the reflective sheeting to produce white light illumination.

The terms "in contact" and "disposed on" are used generally to describe that two items are adjacent one another such that the whole item can function as desired. This may mean that additional materials can be present between the adjacent items, as long as the item can function as desired.

What is claimed is:

1. An optical device comprising:
   a light source;
   a viscoelastic lightguide, wherein light emitted by the light source enters the viscoelastic lightguide and is transported within the lightguide by total internal reflection; and
   a retroreflective film suitable for retroreflecting light and comprising
      a layer of transparent microspheres and
      reflective material disposed in back of the layer;
   wherein the viscoelastic lightguide is disposed in front of the layer of transparent microspheres such that light being transported within the viscoelastic lightguide is extracted from the lightguide and retroreflected by the transparent microspheres;
   wherein the viscoelastic lightguide comprises a pressure sensitive adhesive; and
   wherein the light emitted by the light source is transported within the pressure sensitive adhesive of the viscoelastic lightguide.

2. The optical device of claim 1, the retroreflective film further comprising a binder, wherein the transparent microspheres are partially embedded in the binder, and the reflective material is disposed between the microspheres and the binder.

3. The optical device of claim 1, the retroreflective film further comprising a transparent binder, wherein the transparent microspheres are completely embedded in the transparent binder, and the reflective material is disposed between the microspheres and the transparent binder.

4. The optical device of claim 1, wherein the reflective material is discontinuous across the retroreflective film.

5. The optical device of claim 1, wherein the reflective material forms a reflective layer.

6. The optical device of claim 1, wherein the reflective material is a reflective binder, and the transparent microspheres are partially embedded in the reflective binder.

7. The optical device of claim 1, the retroreflective film further comprising a transparent binder, wherein the transparent microspheres are at least partially embedded in the transparent binder, and the transparent binder is disposed between the viscoelastic lightguide and the layer of transparent microspheres.

8. The optical device of claim 1, the retroreflective film further comprising a transparent binder, wherein the transparent microspheres are at least partially embedded in the transparent binder, the transparent binder is disposed between the viscoelastic lightguide and the layer of transparent microspheres, and the transparent binder and the reflective material are in direct contact with each other.

9. The optical device of claim 1, the retroreflective film further comprising a transparent binder, wherein the transparent microspheres are at least partially embedded in the transparent binder, the transparent binder is disposed between the viscoelastic lightguide and the layer of transparent microspheres, and the transparent binder and the reflective material are not in direct contact with each other.

10. The optical device of claim 1, the retroreflective film further comprising a transparent binder, wherein the transparent microspheres are at least partially embedded in the transparent binder, and the transparent binder is disposed between the transparent microspheres and the reflective material.

11. The optical device of claim 1, the retroreflective film further comprising a transparent binder, wherein the transparent microspheres are at least partially embedded in the transparent binder, the transparent binder is disposed between the transparent microspheres and the reflective material, and the reflective material forms a reflective layer.

12. The optical device of claim 1, the retroreflective film further comprising a cover film disposed in front of the transparent microspheres and supported by a network of walls extending from the reflective material to the cover film such that at least some of the transparent microspheres are surrounded by the walls.

13. The optical device of claim 1, the retroreflective film further comprising a cover film disposed in front of the transparent microspheres and supported by a network of walls extending from the reflective material to the cover film, wherein at least some of the transparent microspheres are grouped together by the walls.

14. The optical device of claim 1, wherein the viscoelastic lightguide is in direct contact with the retroreflective film.

15. The optical device of claim 1, further comprising one or more optional layers, the optional layers comprising:
   a first optional layer disposed between the viscoelastic lightguide and the retroreflective film, a second optional layer disposed on the viscoelastic lightguide opposite the retroreflective film, and a third optional layer disposed on the retroreflective film opposite the viscoelastic lightguide.

16. The optical device of claim 1, wherein an image is provided by one or more of:

the viscoelastic lightguide, a first optional layer disposed between the viscoelastic lightguide and the retroreflective film, and a second optional layer disposed on the viscoelastic lightguide opposite the retroreflective film.

17. The optical device of claim 1, wherein an image is provided by one or more of:

an imaging layer disposed between the layer of transparent microspheres and the reflective material, an imaging layer disposed between the retroflective film and the viscoelastic lightguide, and an imaging layer disposed on the viscoelastic lightguide opposite the retroreflective film.

18. An optical device comprising:

a light source;

a viscoelastic lightguide, wherein light emitted by the light source enters the viscoelastic lightguide and is transported within the lightguide by total internal reflection; and a retroreflective film suitable for retroreflecting light and comprising a layer of transparent microspheres and not comprising reflective material disposed in back of the layer;

wherein the viscoelastic lightguide is disposed in front of the layer of transparent microspheres such that light being transported within the viscoelastic lightguide is extracted from the lightguide and retroreflected by the transparent microspheres;

wherein the viscoelastic lightguide comprises a pressure sensitive adhesive; and wherein the light emitted by the light source is transported within the pressure sensitive adhesive of the viscoelastic lightguide.

19. An optical device comprising:

a light source and an optical device, the optical device comprising:

a viscoelastic lightguide, wherein light emitted by the light source enters the viscoelastic lightguide and is transported within the lightguide by total internal reflection; and a retroreflective film suitable for retroreflecting light and comprising a layer of transparent microspheres, and reflective material associated with each transparent microsphere and disposed in back of each transparent microsphere;

wherein the viscoelastic lightguide is disposed in front of the layer of transparent microspheres such that light being transported within the viscoelastic lightguide is extracted from the lightguide and retroreflected by the transparent microspheres, wherein the viscoelastic lightguide comprises a pressure sensitive adhesive;

wherein the light emitted by the light source is transported within the pressure sensitive adhesive of the viscoelastic lightguide; and the reflective material associated with each transparent microsphere forms an individual image, and a composite image is formed by the individual images such that the composite image appears to the unaided eye to float in front of the layer of transparent microspheres.

20. An optical device comprising:

a light source and an optical device, the optical device comprising:

a viscoelastic lightguide, wherein light emitted by the light source enters the viscoelastic lightguide and is transported within the lightguide by total internal reflection; and a reflective film suitable for reflecting light and comprising a layer of transparent microspheres, and reflective material associated with each transparent microsphere and disposed in back of each transparent microsphere;

wherein the viscoelastic lightguide is disposed in back of the layer of transparent microspheres such that light being transported within the viscoelastic lightguide is extracted from the lightguide and transmitted through each of the transparent microspheres, wherein the viscoelastic lightguide comprises a pressure sensitive adhesive;

wherein the light emitted by the light source is transported within the pressure sensitive adhesive of the viscoelastic lightguide; and the reflective material associated with each transparent microsphere forms an individual image, and a composite image is formed by the individual images such that the composite image appears to the unaided eye to float in back of the optical device.

* * * * *